May 5, 1931.  J. T. COWLEY ET AL  1,804,153
CONVEYING APPARATUS
Filed Oct. 17, 1927   21 Sheets-Sheet 2

WITNESS.
H. W. Furst

INVENTOR.
James T. Cowley
and
Lavont C. Allen
BY
Denison Thompson
ATTORNEY.

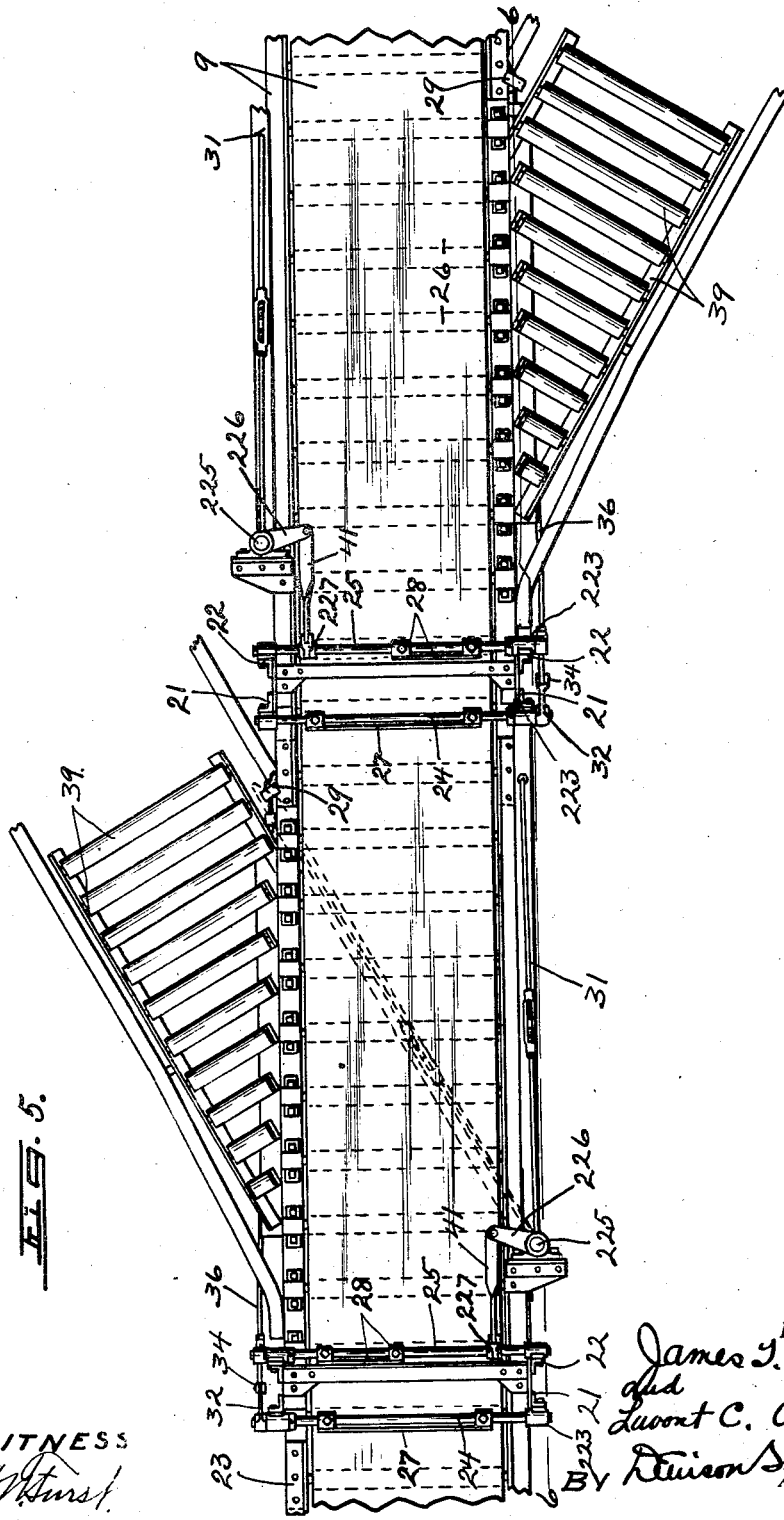

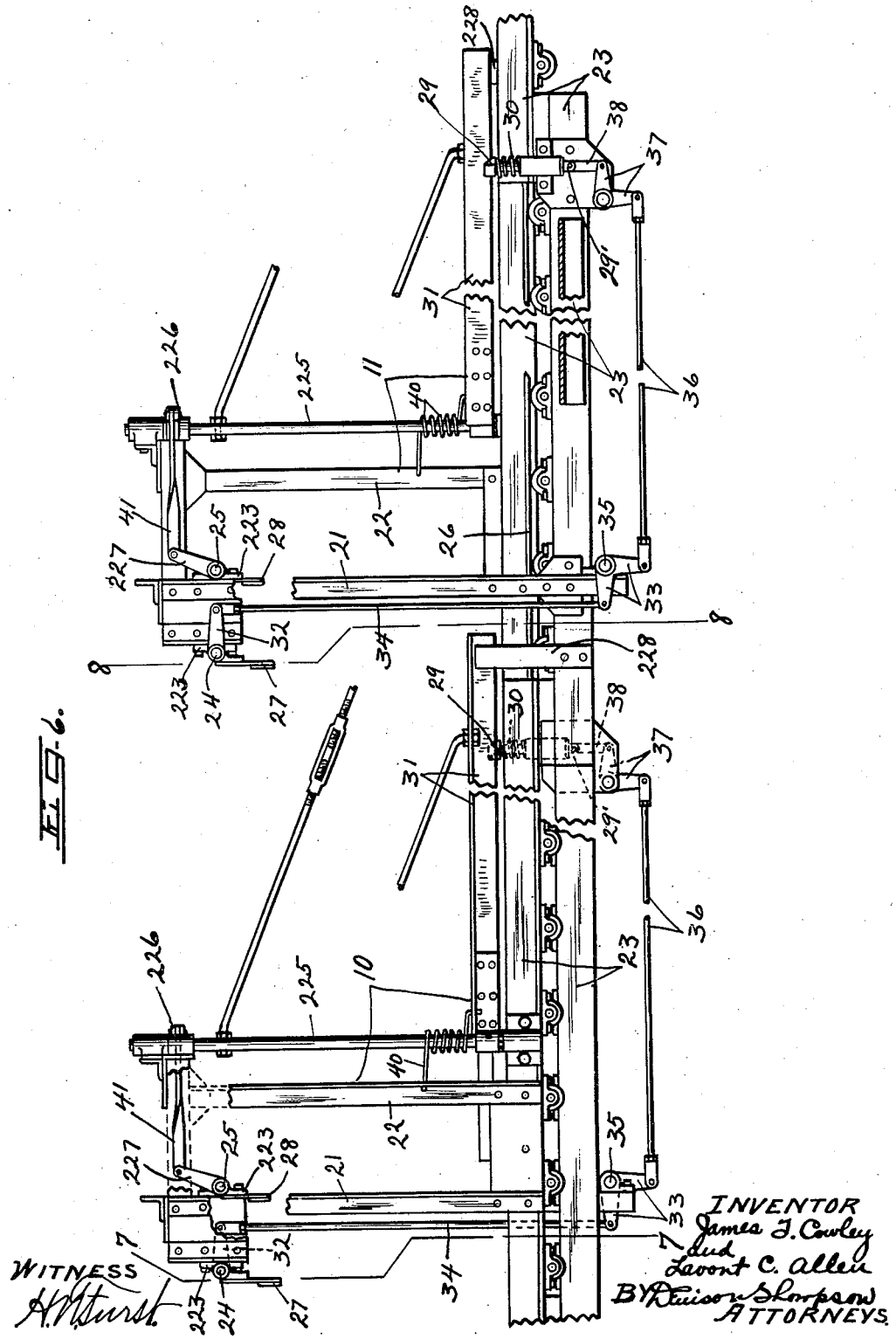

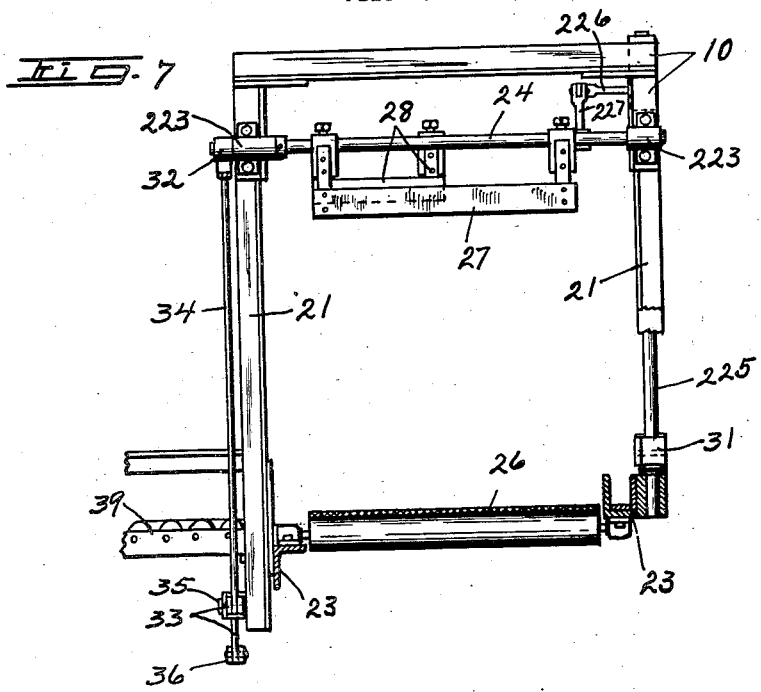
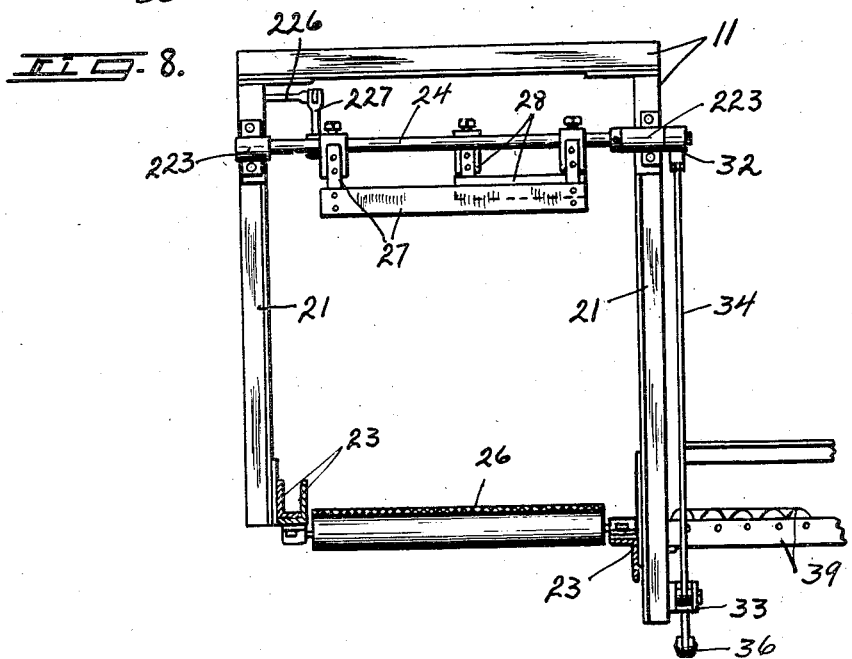

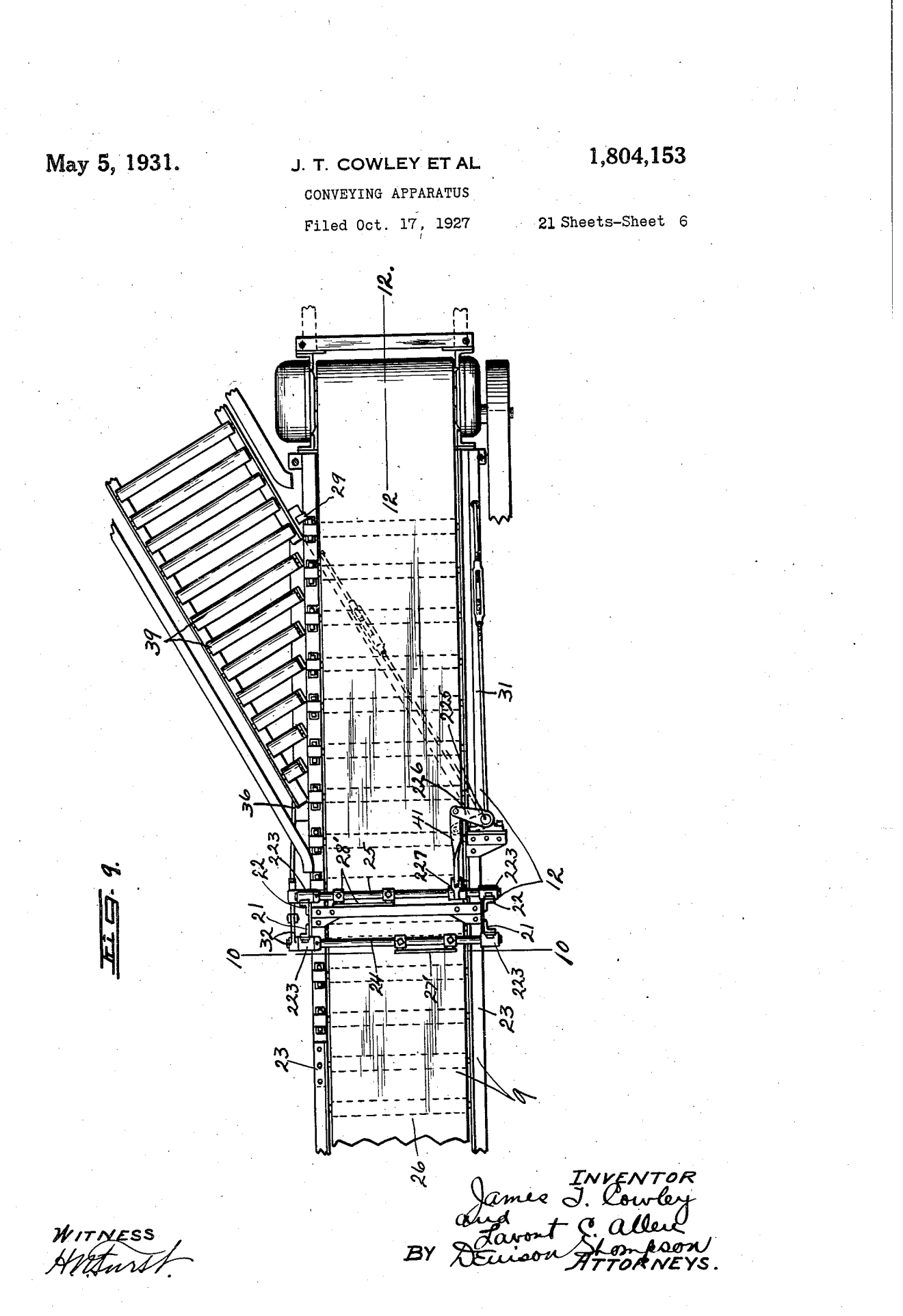

May 5, 1931. J. T. COWLEY ET AL 1,804,153
CONVEYING APPARATUS
Filed Oct. 17, 1927  21 Sheets-Sheet 6

May 5, 1931. J. T. COWLEY ET AL 1,804,153
CONVEYING APPARATUS
Filed Oct. 17, 1927 21 Sheets-Sheet 7
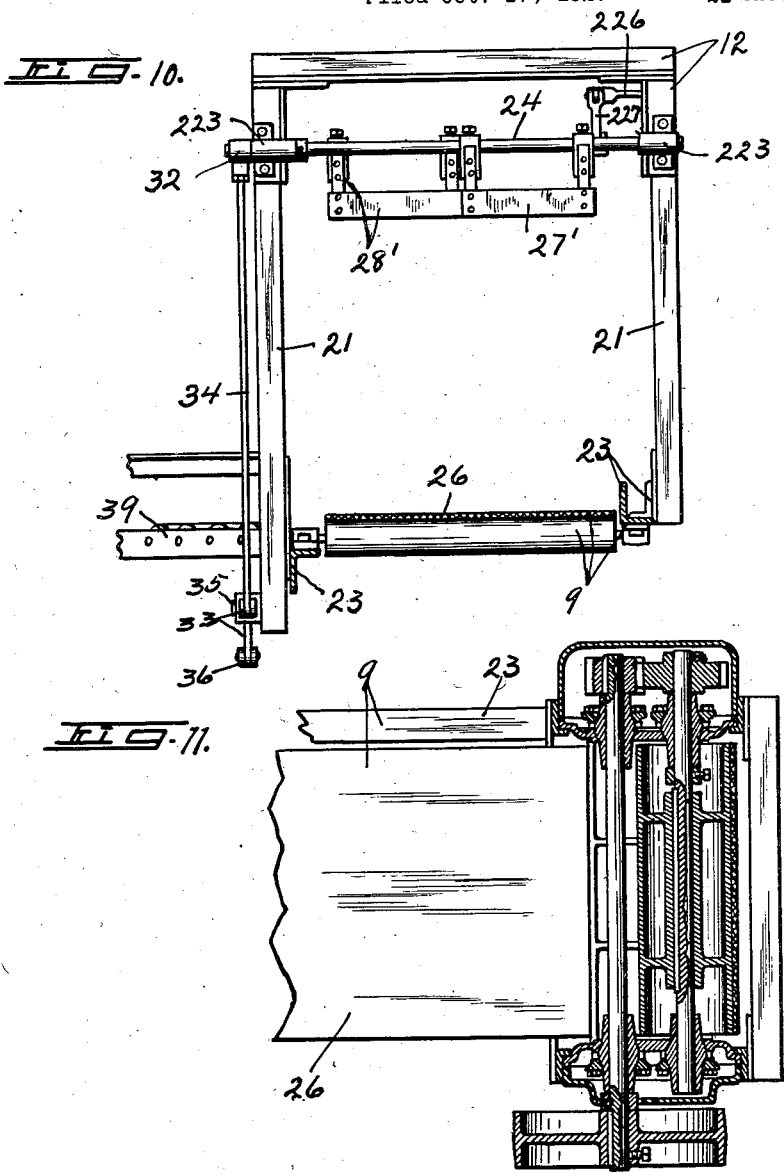
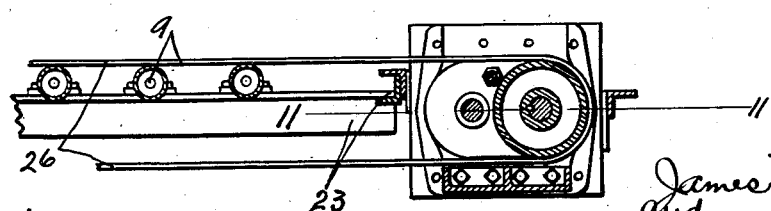

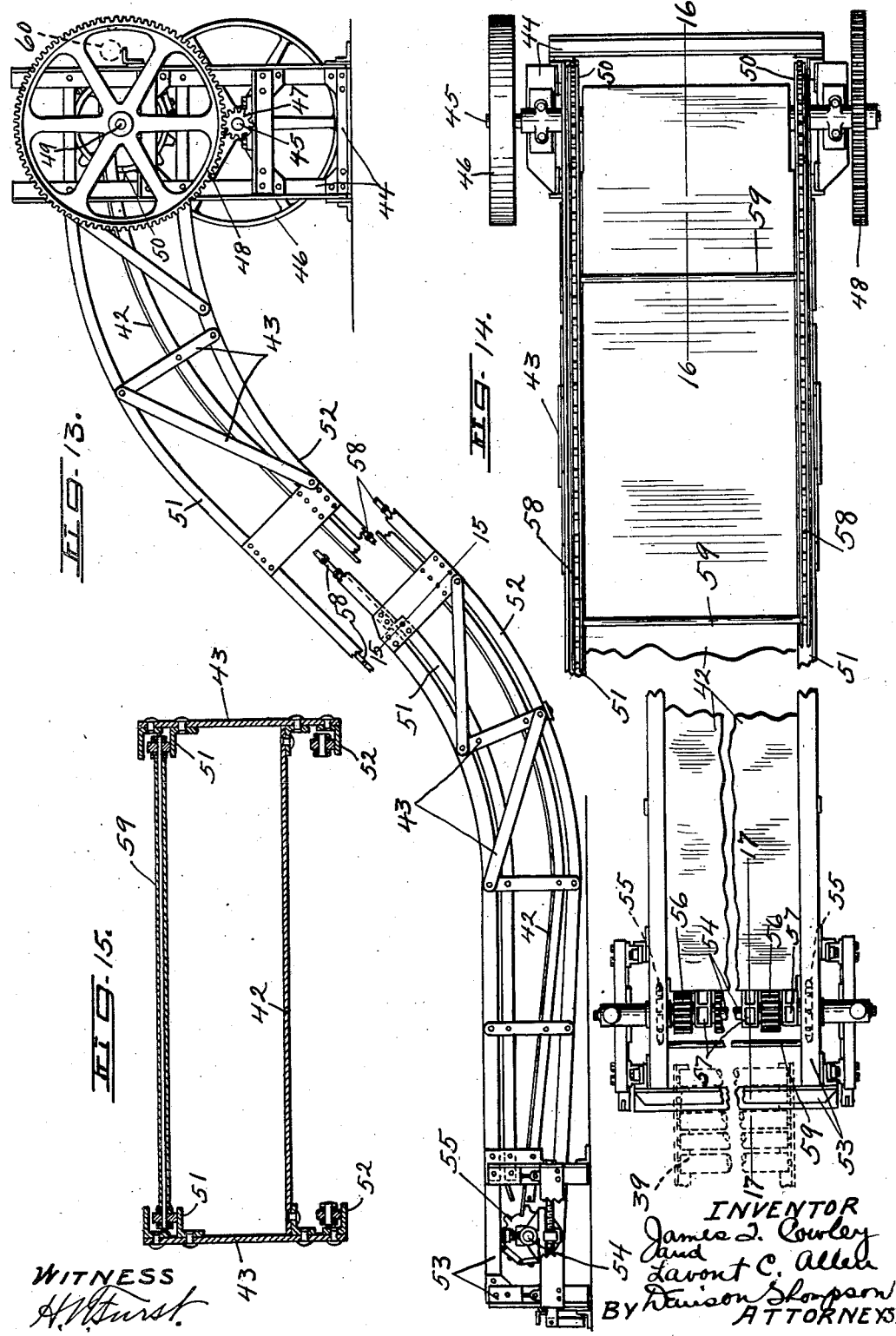

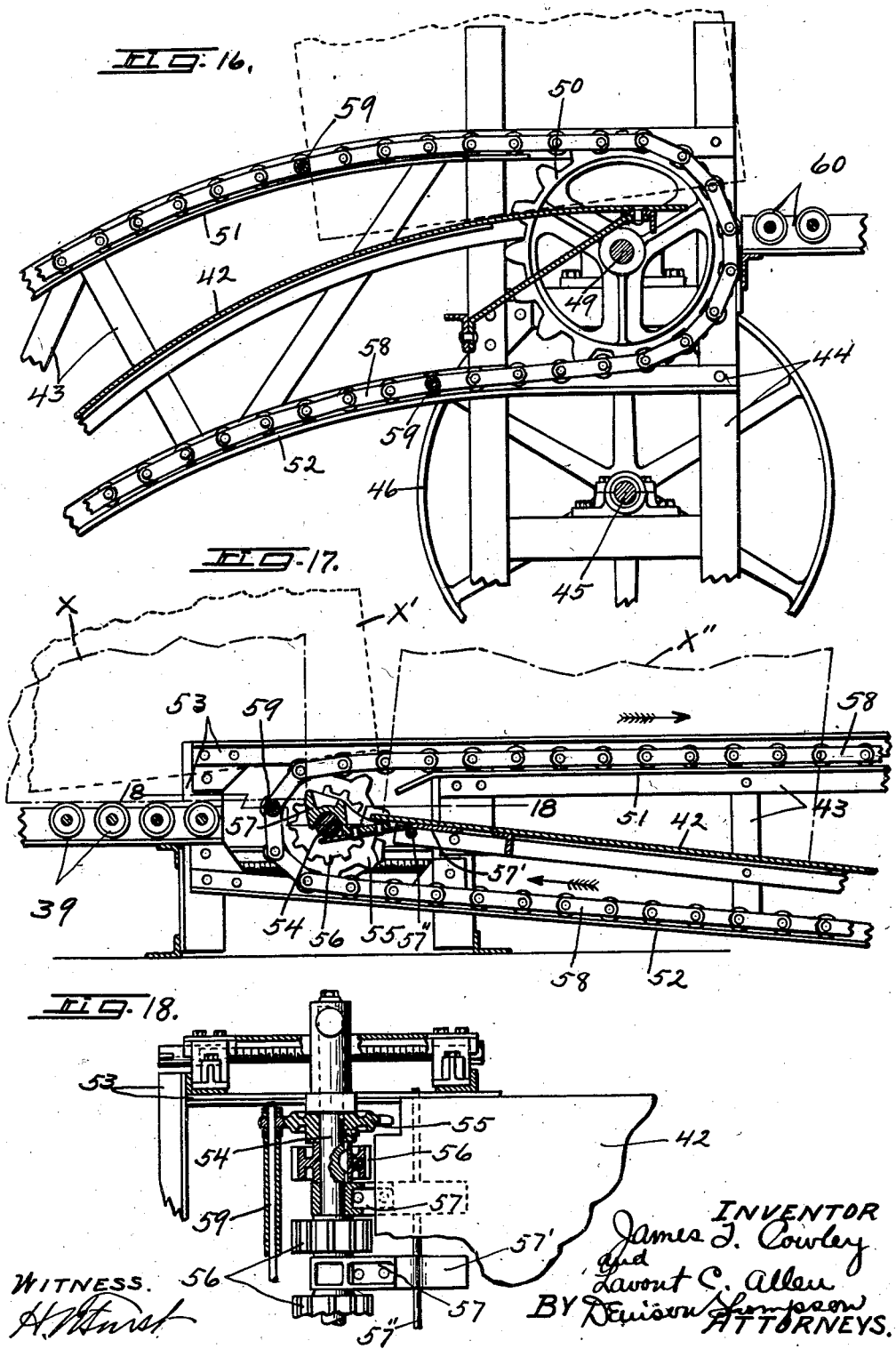

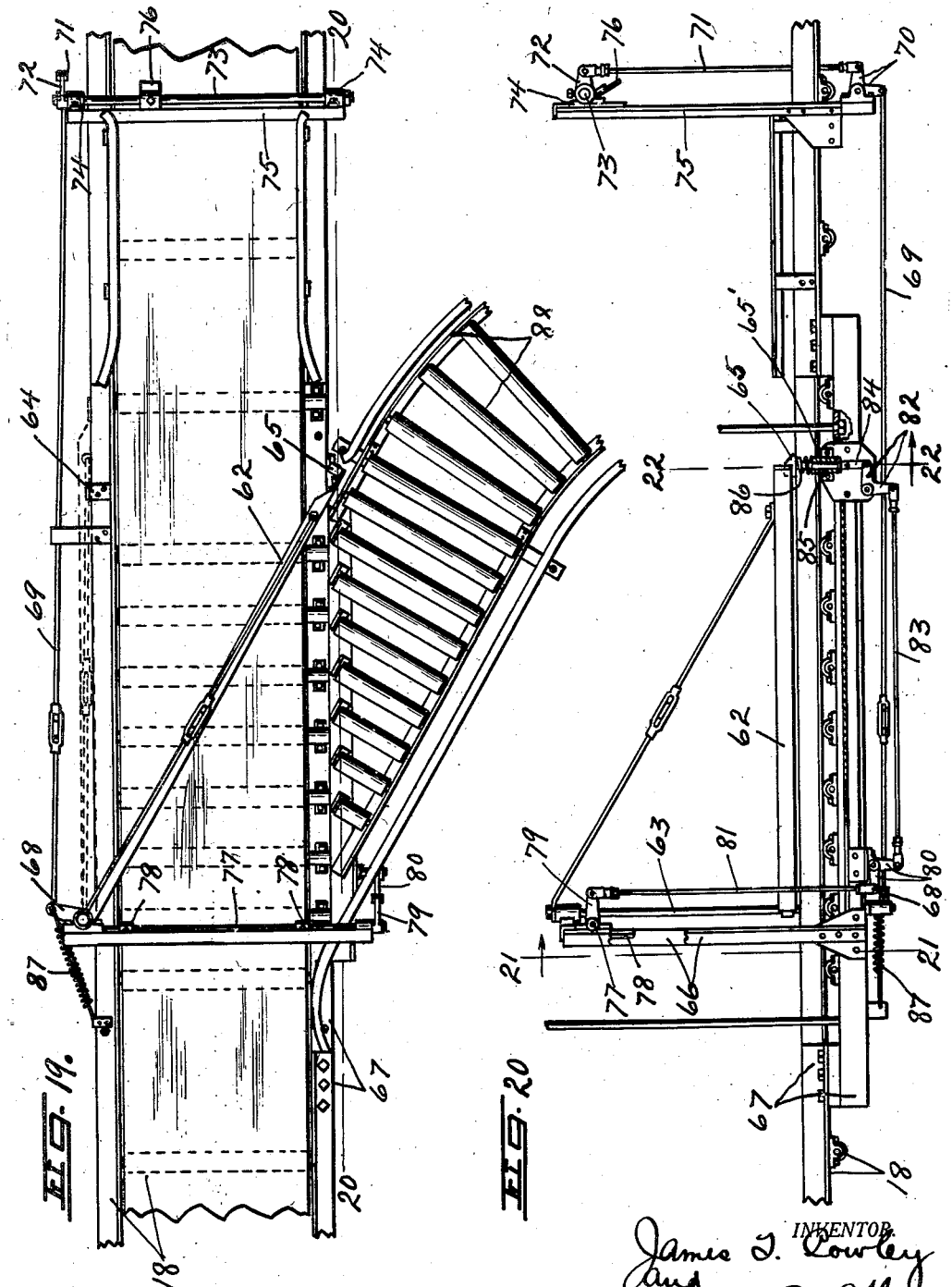

May 5, 1931.  J. T. COWLEY ET AL  1,804,153
CONVEYING APPARATUS
Filed Oct. 17, 1927   21 Sheets-Sheet 11.
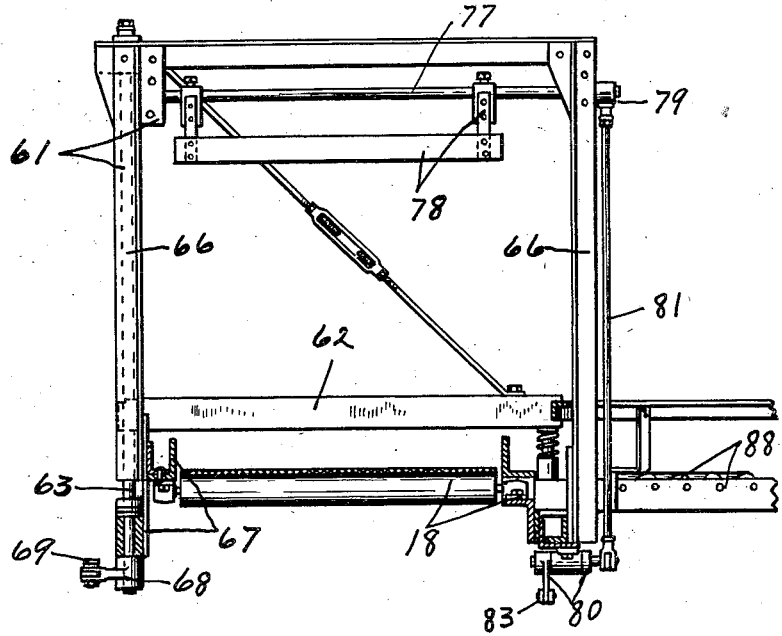
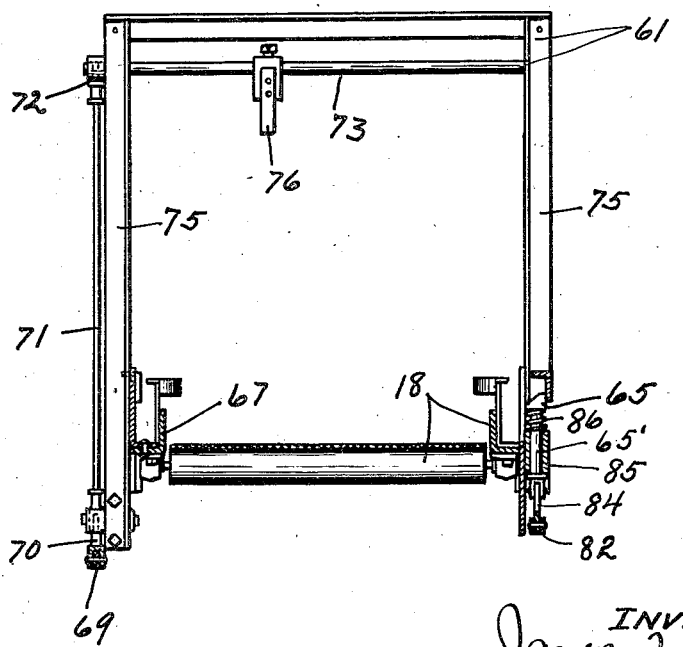

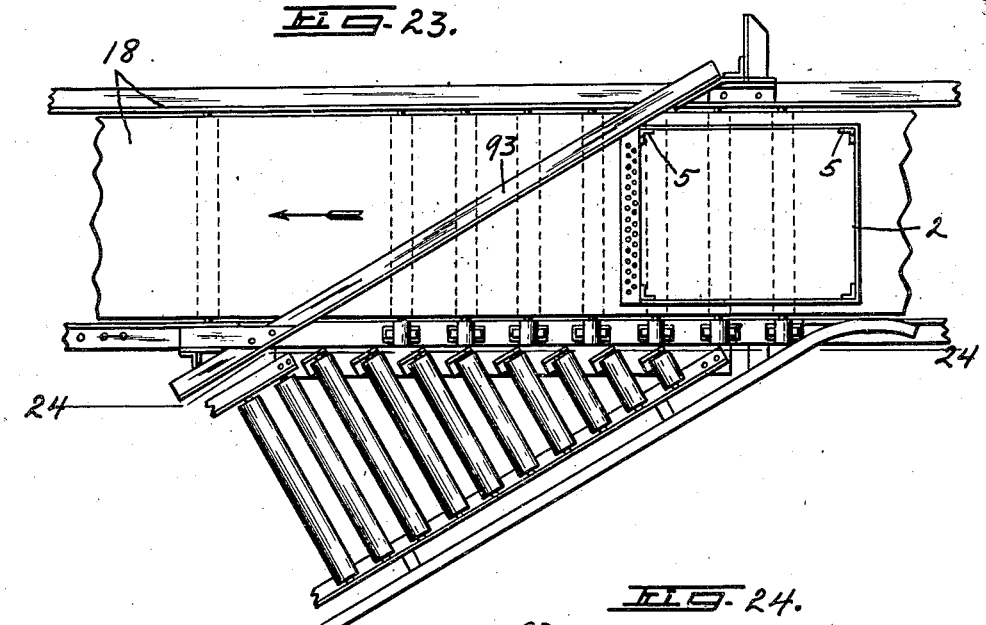
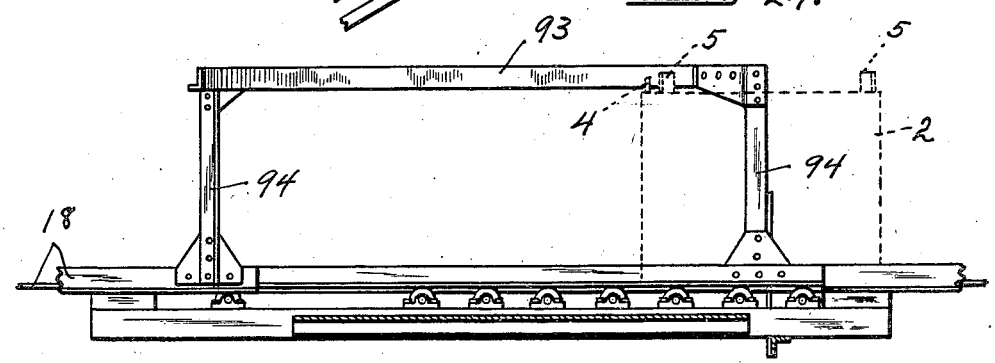
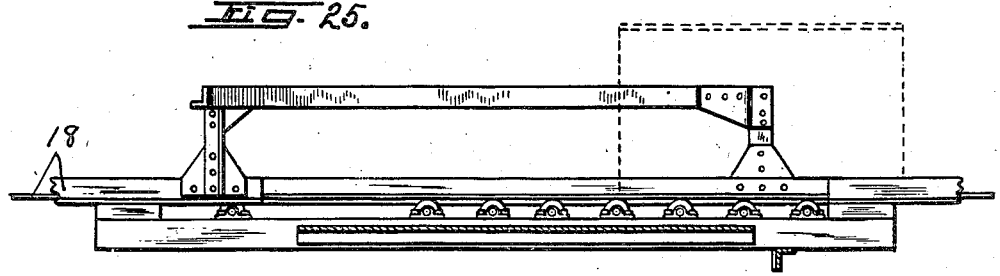

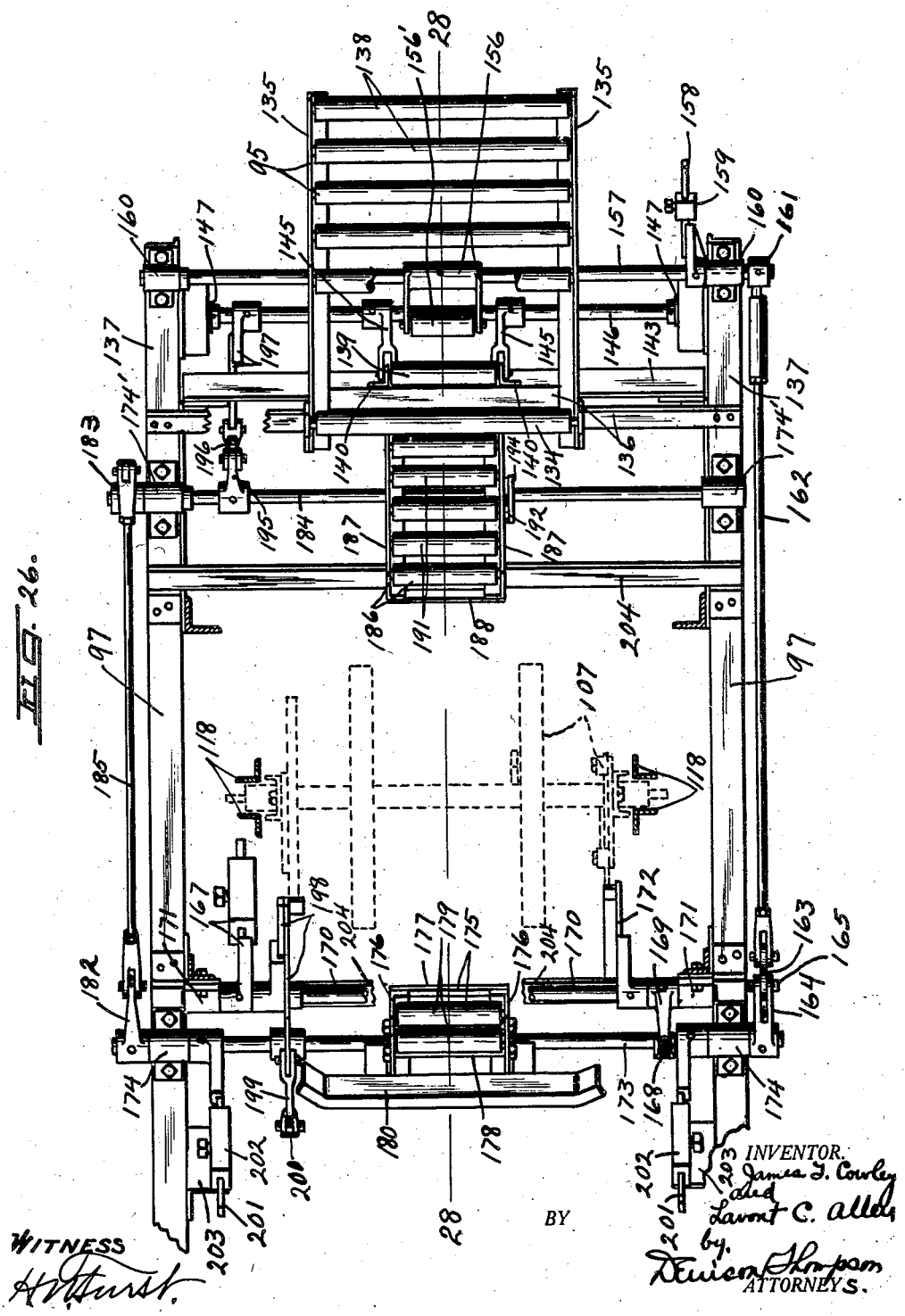

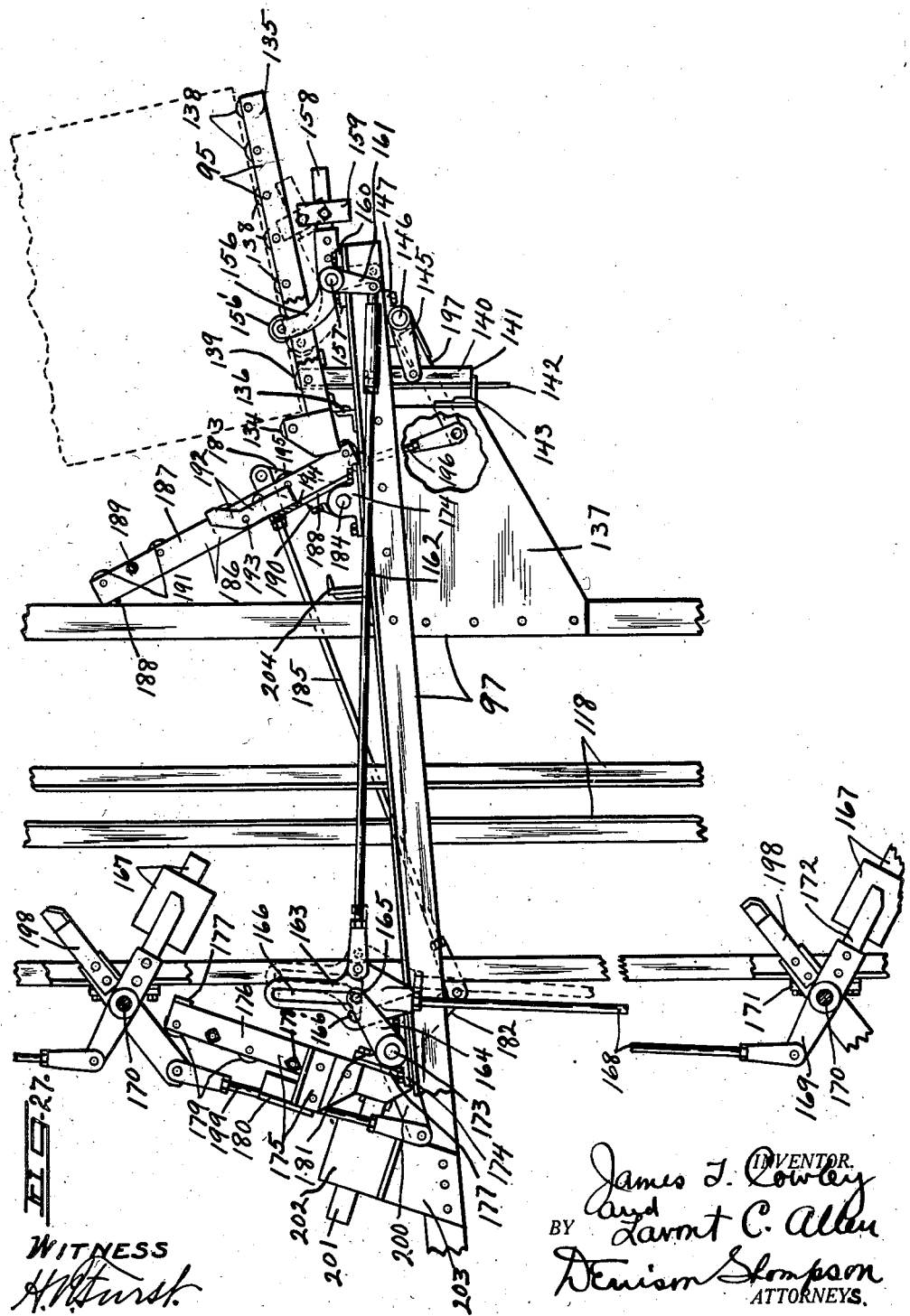

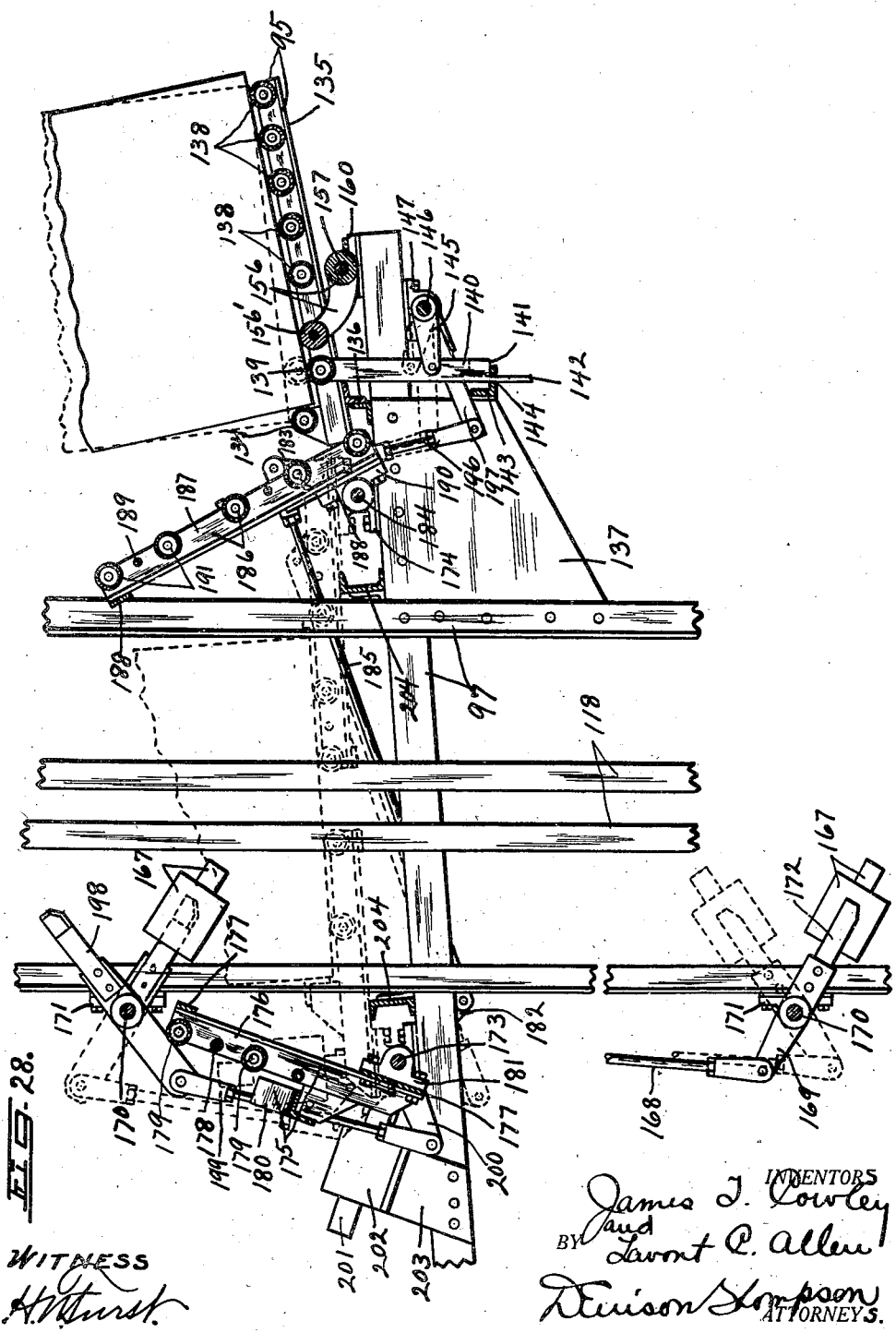

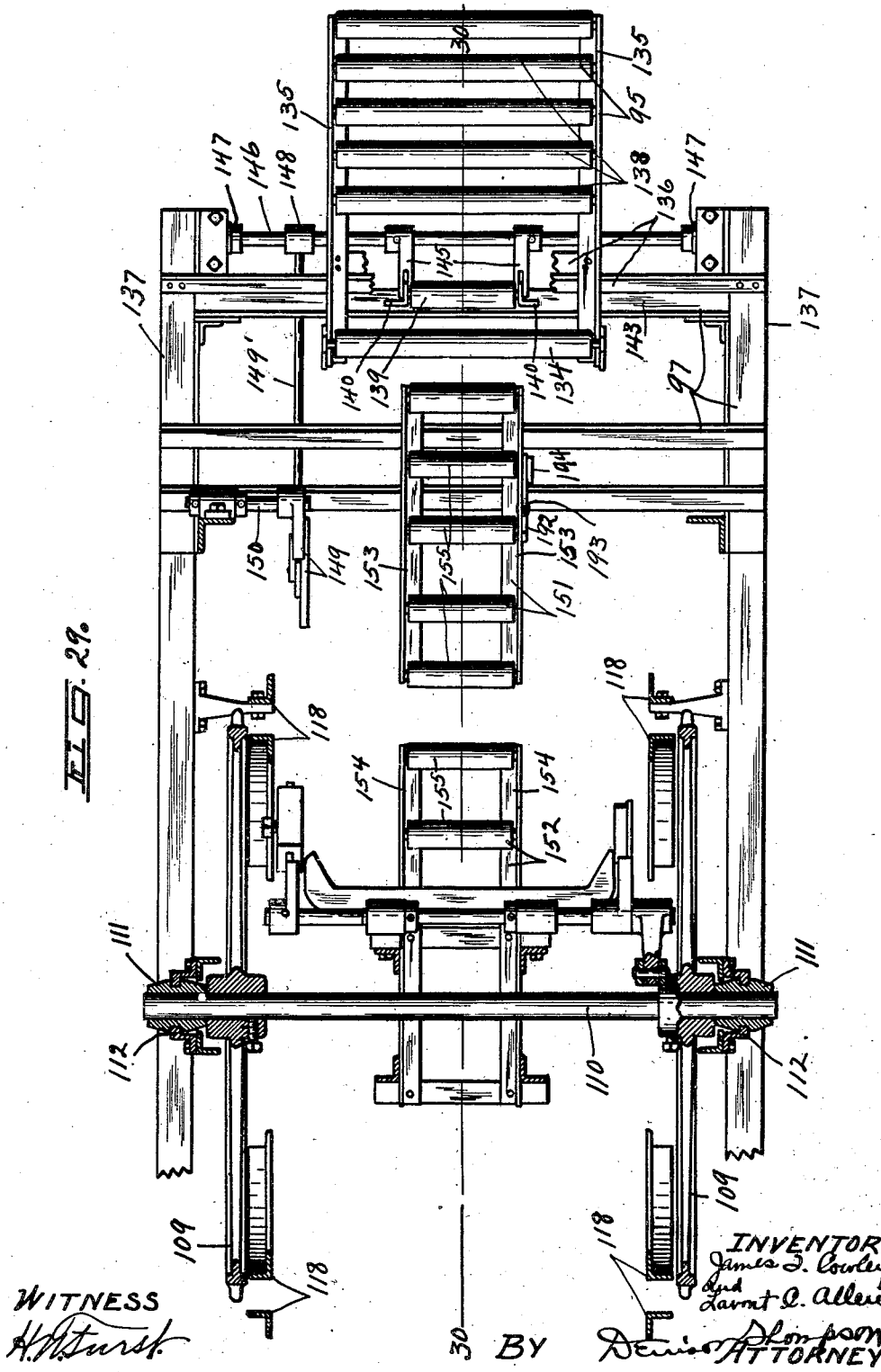

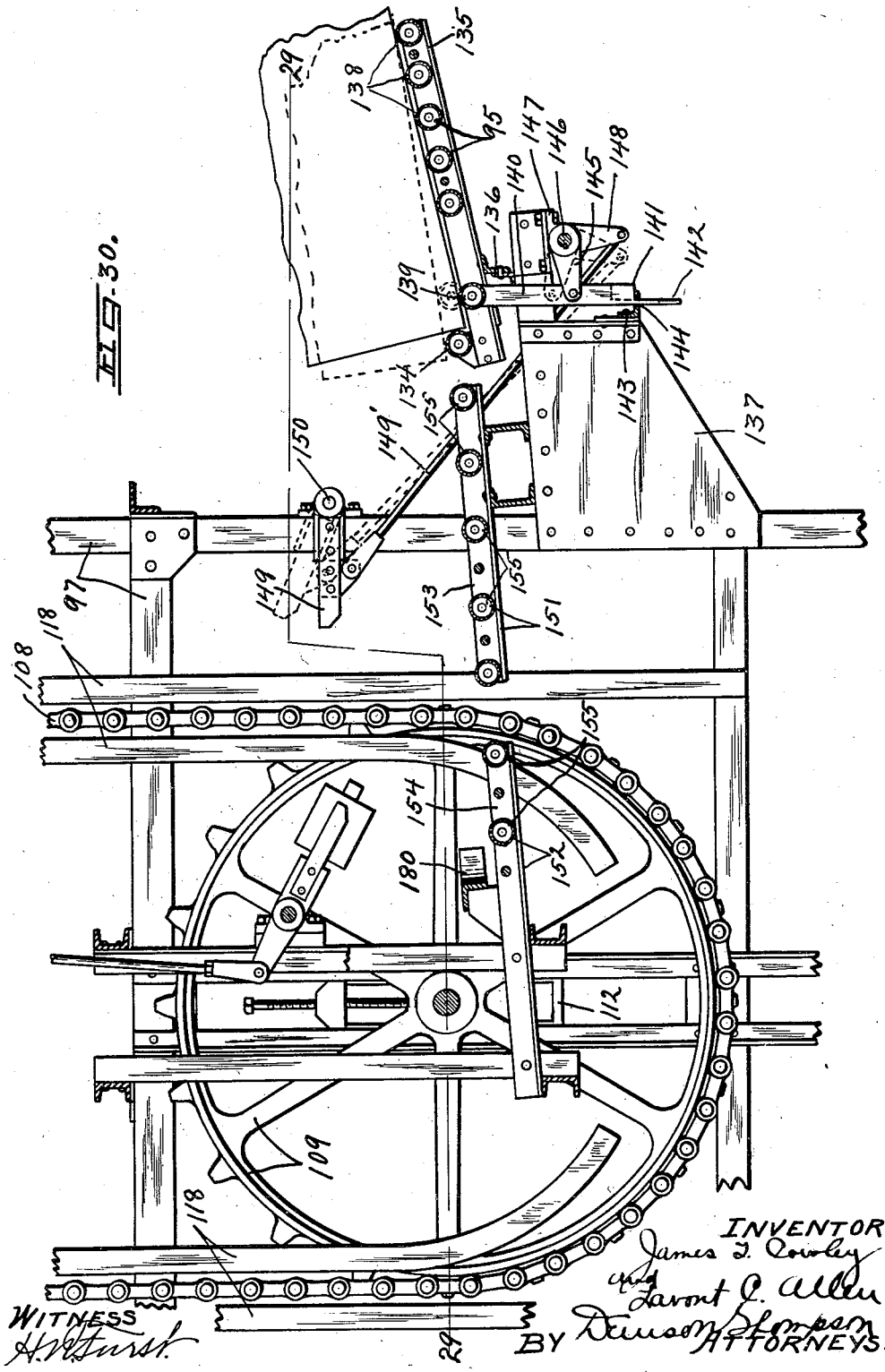

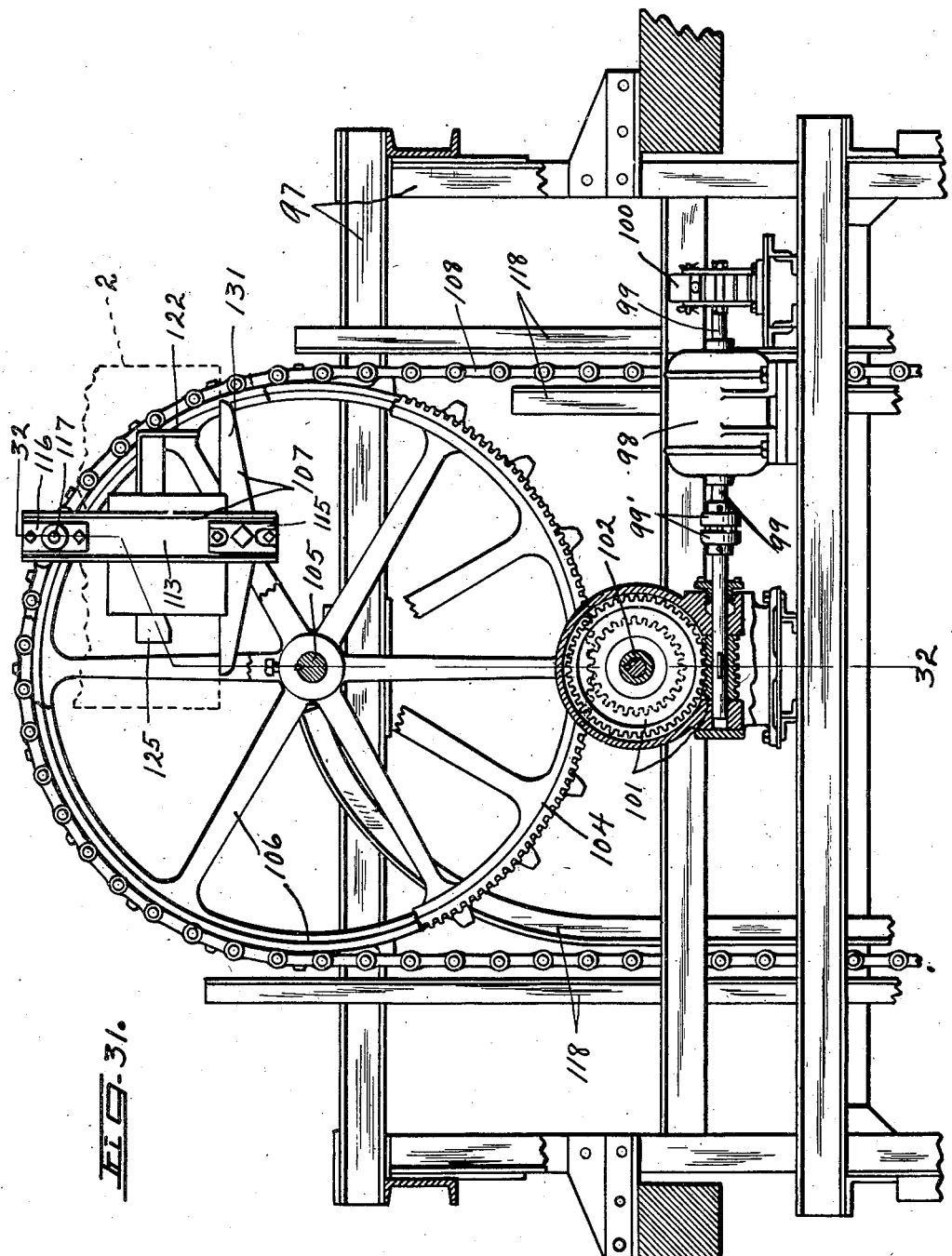

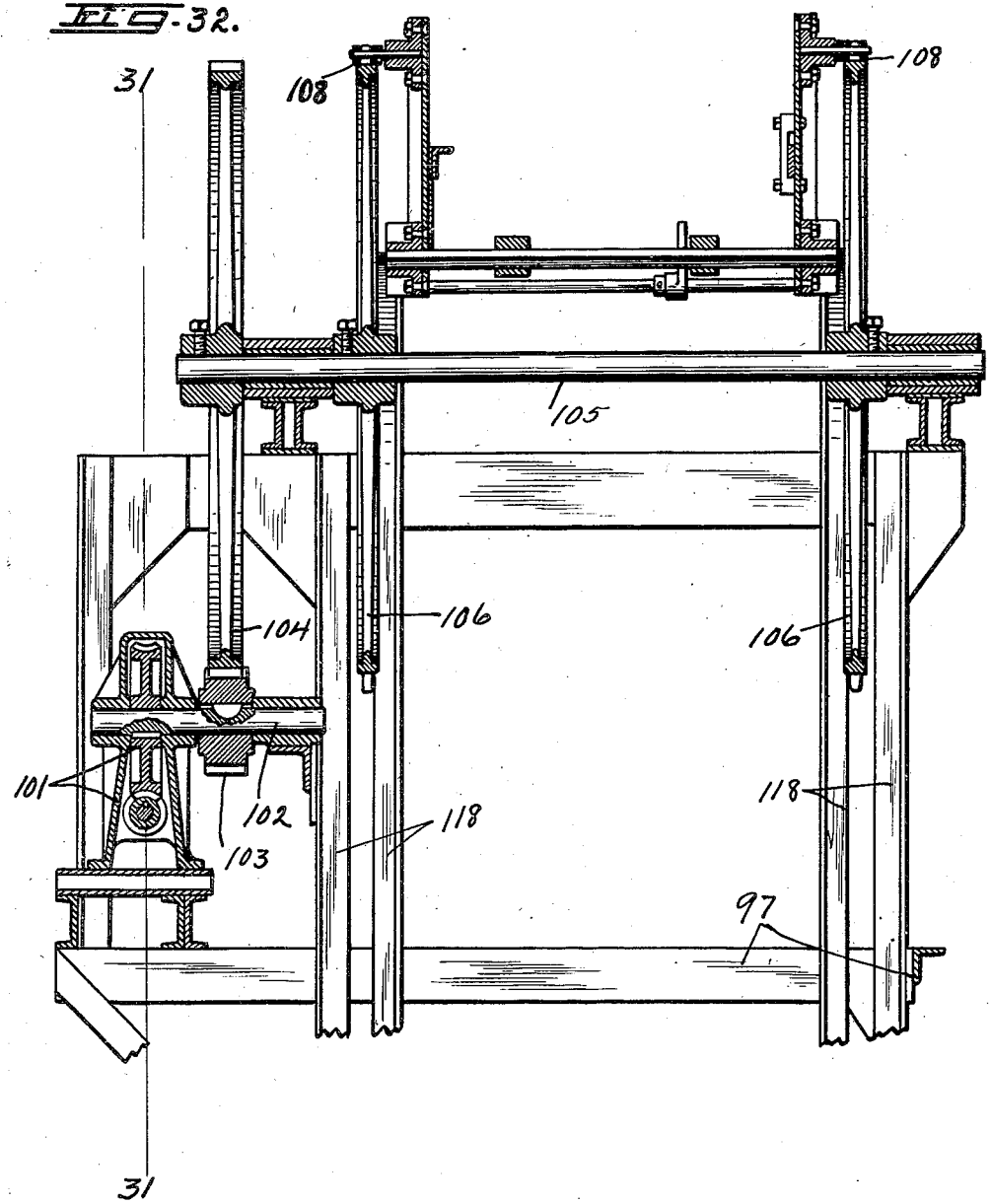

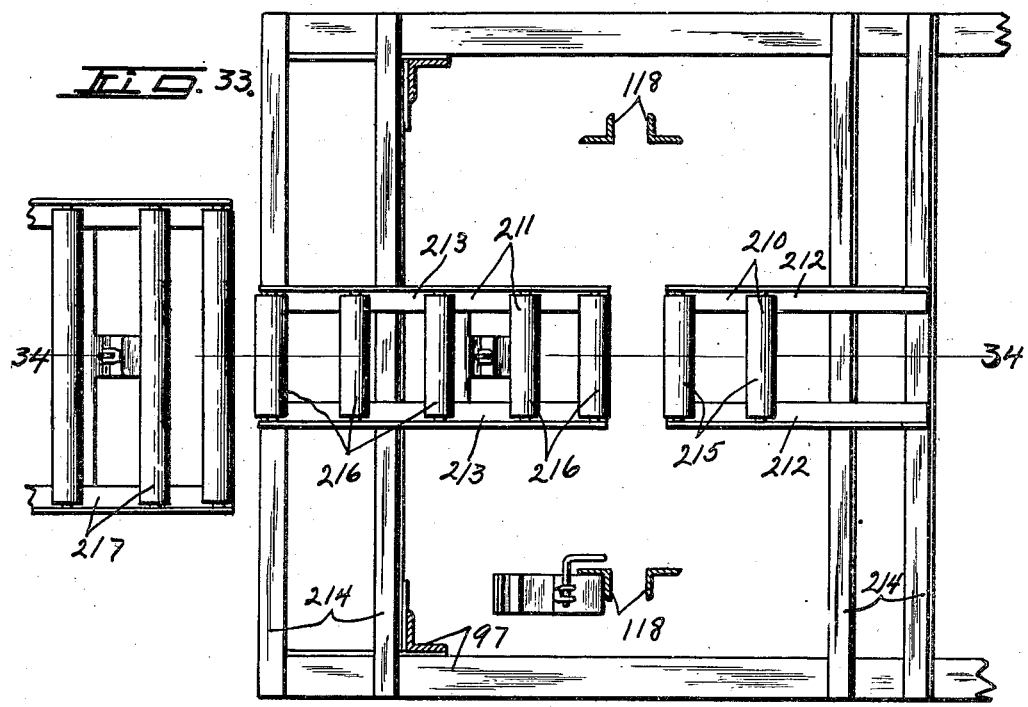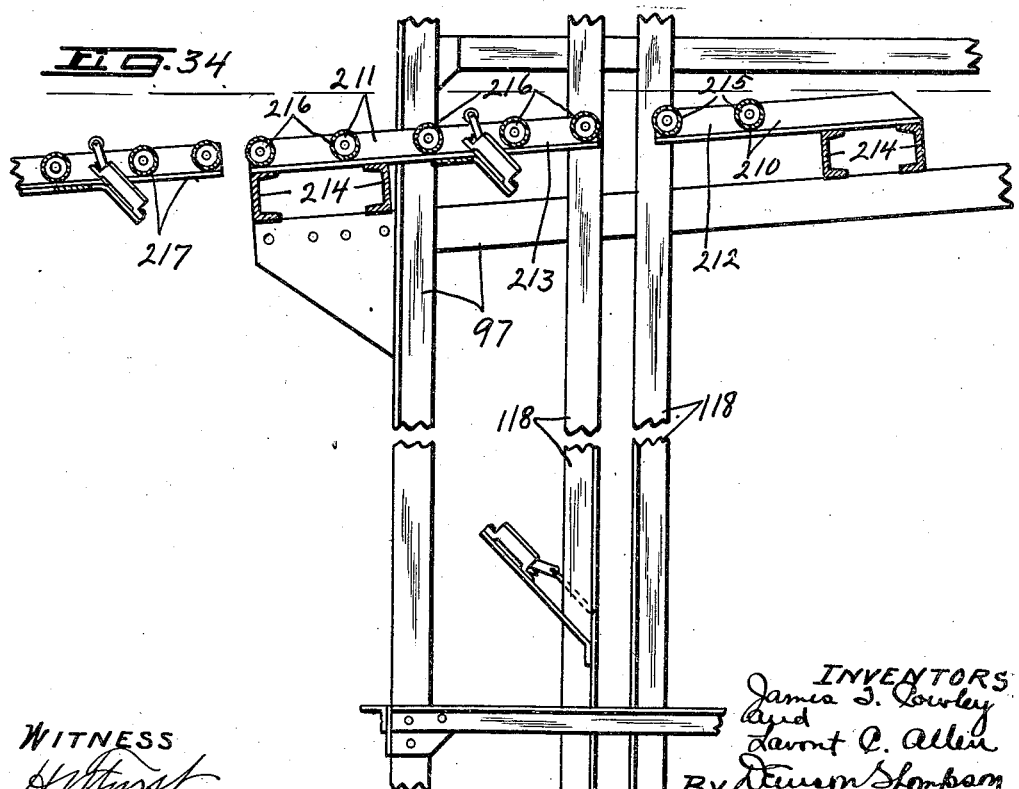

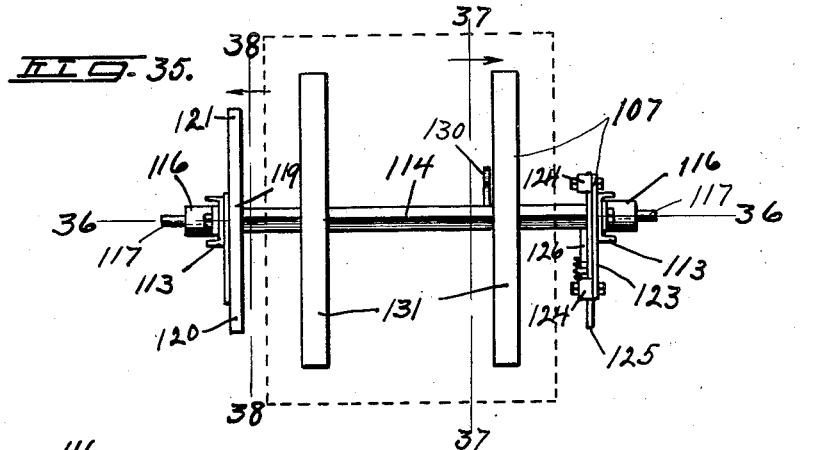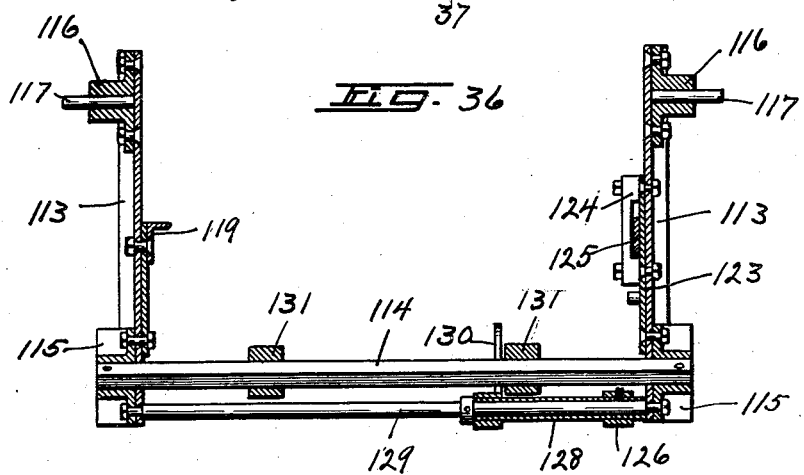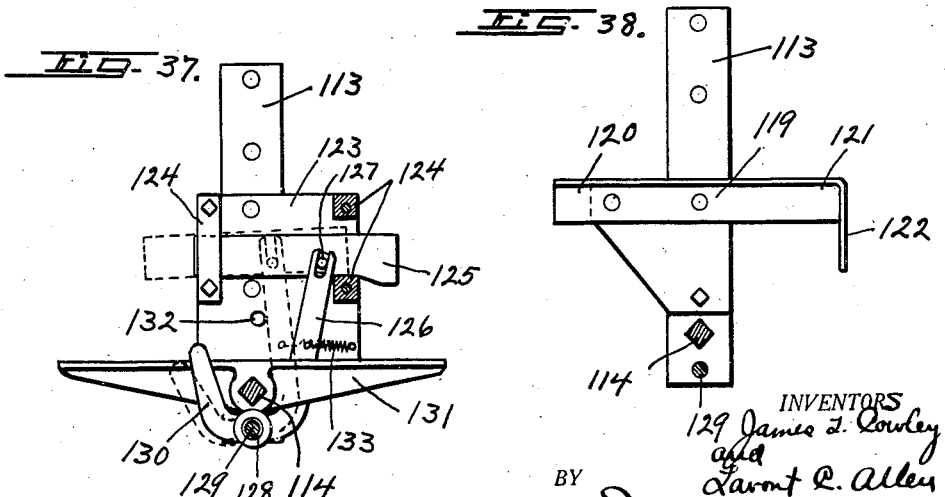

Patented May 5, 1931

1,804,153

UNITED STATES PATENT OFFICE

JAMES T. COWLEY AND LAVONT C. ALLEN, OF SYRACUSE, NEW YORK, ASSIGNORS TO THE LAMSON COMPANY, OF SYRACUSE, NEW YORK, A CORPORATION OF MASSACHUSETTS

CONVEYING APPARATUS

Application filed October 17, 1927. Serial No. 226,659.

This invention relates to new and useful improvements in conveyor systems.

An object of this invention is to construct a conveyor system wherein boxes or crates of merchandise are conveyed singly or in train lots from a common source, and automatically segregated at some selected place upon one of several floors in the same or another building for the purpose of general storage.

A further object resides in the provision and use of a pilot car or pilot cars not themselves intended to carry other articles, for convoying one or more receptacles, containers, boxes or the like, and which pilot car is provided with means for actuating a deflector after the pilot car has passed the deflector, but before the containers have reached the deflector, whereby the container or containers constituting the convoy are deflected from the main conveyor, but the pilot car continues its journey back to its starting point.

A further object of the invention is to provide pilot cars with a plurality of recesses or holes for receiving a tab-operating pin. Said pin, when manually placed in a predetermined recess or hole by a dispatcher, will cause a deflector to automatically switch the pilot car to a booster leading to a two-way feed belt conveyor positioned upon the chosen one of several floors, whereupon said pin will open all closed deflectors in the path of the pilot car stationed along the belt conveyor and close a deflector leading to a predetermined spur conveyor after the pilot car has passed ahead of said deflector.

A further object of the invention is to provide a vertical conveyor which will automatically pick up pilot cars returning from the belt conveyors stationed upon the general storage floors and discharge them upon a common gravity conveyor to be returned to a loading dispatcher.

Other objects and advantages relate to the form and relation of the parts, all as will more fully appear from the following description taken in connection with the accompanying drawings, in which:—

Figure 1 is a diagrammatic drawing of a conveyor system embodying the spirit of our invention wherein merchandise packed in boxes or crates of various size, is conveyed from a common source, and segregated for storage at selected places upon a pre-determined floor. The mechanism is also diagrammatically shown whereby the pilot cars, after having piloted a case or train of cases of merchandise from the common source, to their respective general storage floor, are automatically returned to the starting position.

Figure 5 is a top plan of a section of a belt conveyor showing relative position of the first two automatic floor-selecting deflectors together with a portion of their respective gravity conveyors leading from each.

Figure 6 is a partial longitudinal section taken in the plane of line 6—6, Figure 5, showing the position of the pin-operated tabs and their respective relation to the deflector bars.

Figure 1:
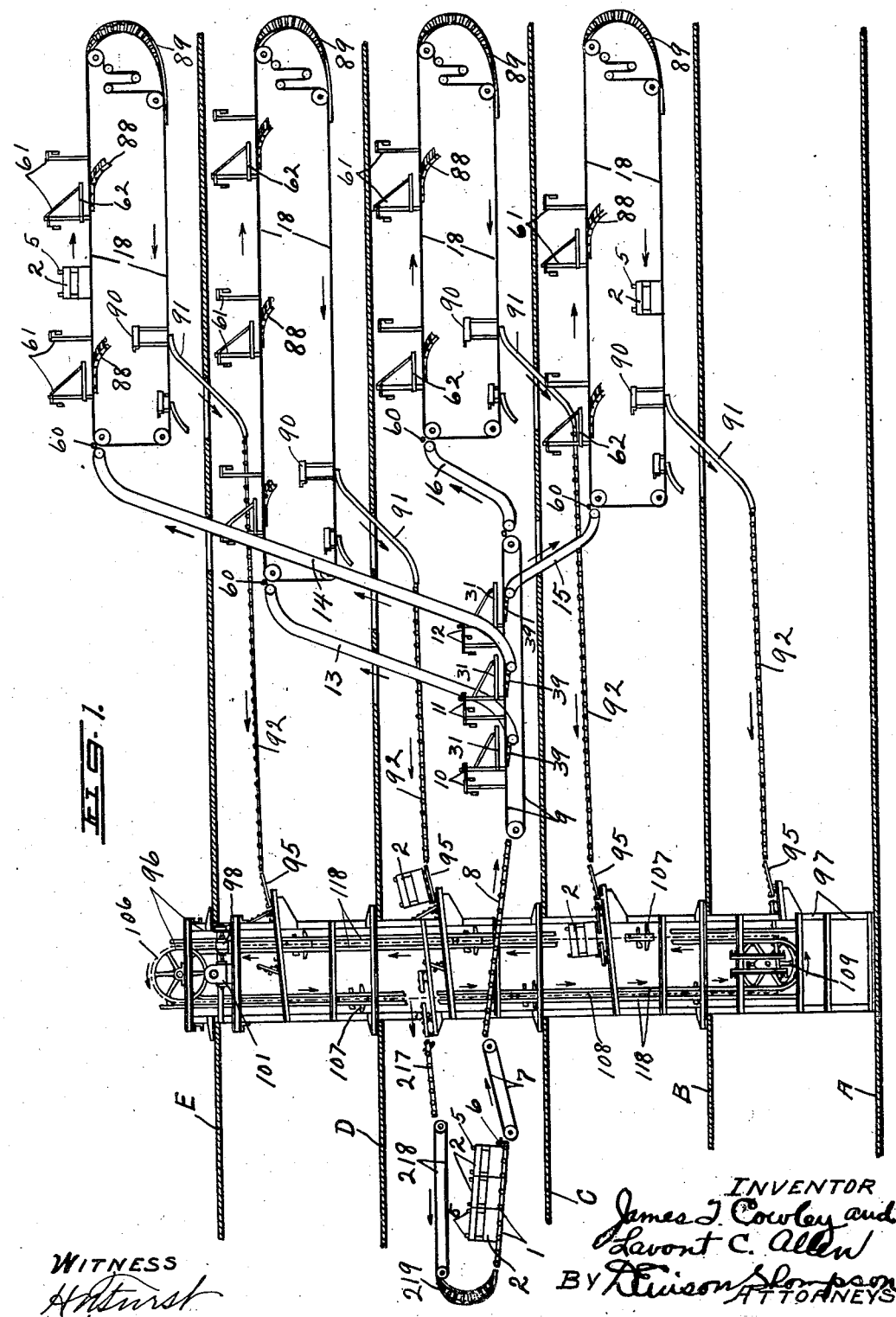

Figures 7 and 8 are vertical cross-sections of the belt conveyor taken on the plane of lines 7—7 and 8—8 respectively, Figure 6, showing the belt conveyor and the pin-actuated tabs and the relative position of each.

Figure 9 is a top plan of the foot end portion of a belt conveyor showing the third automatic floor selecting deflector and a portion of the gravity conveyor leading therefrom.

Figure 10 is a longitudinal cross section of the belt conveyor taken in the plane of line 10—10, Figure 9, showing the belt and the pin-actuated tabs and the respective relation thereof.

Figure 11 is a horizontal detail sectional view of the belt conveyor taken in the plane of line 11—11, Figure 12, showing the belt driving mechanism.

Figure 12 is a vertical section of the foot end of the belt conveyor taken on the plane of line 12, 12, Figure 9.

Figure 13 is a side elevation of one of the improved boosters with the center portion partially broken away.

Figure 14 is a top plan of the upward booster partially broken away.

Figure 15 is a vertical cross-section of the booster taken in the plane of line 15—15, (Fig. 13) showing the guides for the chain together with one of the pusher bars in section.

Figure 16 is a longitudinal vertical section of the drive end of the booster taken in the plane of line 16, 16, Figure 14.

Figure 17 is a longitudinal vertical section of the feed end of the booster taken in the plane of line 17—17, Fig. 14, showing the automatic stop and the manner in which the pilot cars and cases of merchandise are automatically fed on to the booster.

Figure 18 is a detail horizontal sectional view taken in the plane of line 18—18, Figure 17, showing a portion of the automatic stops, the corrugated feed-rolls and pusher bar.

Figure 19 is a top plan of a portion of one of the two-way feed belt conveyors located in the general storage showing one of the double acting automatic deflectors, together with a portion of the gravity conveyor which connects the feed belt conveyor with one of the spur line conveyors (partially indicated).

Figure 20 is a partial longitudinal vertical sectional view taken on the plane of line 20—20, Figure 19, showing the pin-actuated tabs together with their respective operating relation with the deflector bar.

Figure 21 is a vertical cross-section of the two-way feed belt conveyor taken on the plane of line 21—21, Figure 20, and showing the pin-actuated tab, the deflector-bar and top run of the belt.

Figure 22 is a vertical cross-section of the feed belt conveyor taken on the plane of line 22—22, Figure 20, showing the deflector bar locking latch and the deflector bar engaged therewith, also the pin-actuated tab for operating the deflector bar.

Figure 23 is a top plan of a section of the lower or return portion of one of the two-way feed belt conveyors showing one of the pilot car fixed deflectors, together with a portion of the gravity conveyor leading therefrom, and one of the deflector arms of a pilot car about to engage the fixed deflector bar.

Figure 24 is a longitudinal vertical section taken in the plane of line 24—24, Figure 23.

Figure 25 is a longitudinal vertical section similar to Figure 24 of a fixed deflector used in deflecting cases of merchandise from the lower or return portion of the two-way feed belt conveyor, a case of merchandise being represented in dotted lines as about to engage the deflector bar.

Figure 26 is a horizontal section through the loading side of a vertical conveyor showing one of the automatic movable loading stations in top plan. An automatic selective elevator car is shown in dotted lines as it would appear in passing up through the station, a portion of the fixed gravity feed being broken away to better disclose the automatic lock trip.

Figure 27 is a side elevation of a portion of one side of a vertical conveyor together with an automatic movable loading station, some portions of which are broken away to better reveal the mechanism thereof. The full lines show the station in its normal empty position, while the dotted lines indicate the position the different parts assume when a pilot car is fed into the fixed gravity feed forcing the automatic lock-arm downward, bringing the station-closing lever into locking engagement with the platform-actuating arm.

Figure 28 is a detail vertical section taken in the plane of line 28—28, Figure 26. The full lines show the automatic movable loading station with a pilot car fed into the fixed gravity feed in readiness to be automatically released and fed over the lowered platform into the path of an oncoming automatic selective vertical conveyor car, as shown in dotted lines.

Figure 29 is a horizontal section of the lower sprocket wheel of the vertical conveyor taken in the plane of line 29—29, Figure 30, and also showing the fixed automatic loading station in top plan.

Figure 30 is a detail vertical section of the fixed loading station taken in the plane of line 30—30, Figure 29.

Figure 31 is a detail vertical section of the drive or upper end of the vertical conveyor taken in the plane of line 31—31, Figure 32, the drive-gear and one sprocket-wheel being partially broken away to better illustrate the movement of the car, together with its load in passing from one side of the vertical conveyor to the other.

Figure 32 is a detail vertical cross-section of the drive end of the vertical conveyor and one of the vertical conveyor cars, taken in the plane of line 32—32, Figure 31.

Figure 33 is a horizontal section taken through the unloading side of the vertical conveyor showing the fixed unloading station in top plan.

Figure 34 is a detail vertical section taken in the plane of line 34—34, Figure 33, showing the relative position of circuit breaker switch mechanism.

Figure 35 is a top plan of one of the automatic selective elevator cars showing in dotted lines the outline of a pilot car in carrying position.

Figure 36 is a longitudinal vertical section of a vertical conveyor car taken in the plane of line 36—36, Figure 35.

Figures 37 and 38 are detail vertical sections taken in the plane of lines 37—37, and 38—38 respectively, Figure 35, showing the automatic tripping mechanism.

In the diagrammatic view, Figure 1, A, B, C, D and E represent the first, second, third, fourth and fifth floors respectively of a building to be used for the conveying and storage of merchandise which has previously been packed in crates or boxes.

Figure 2:
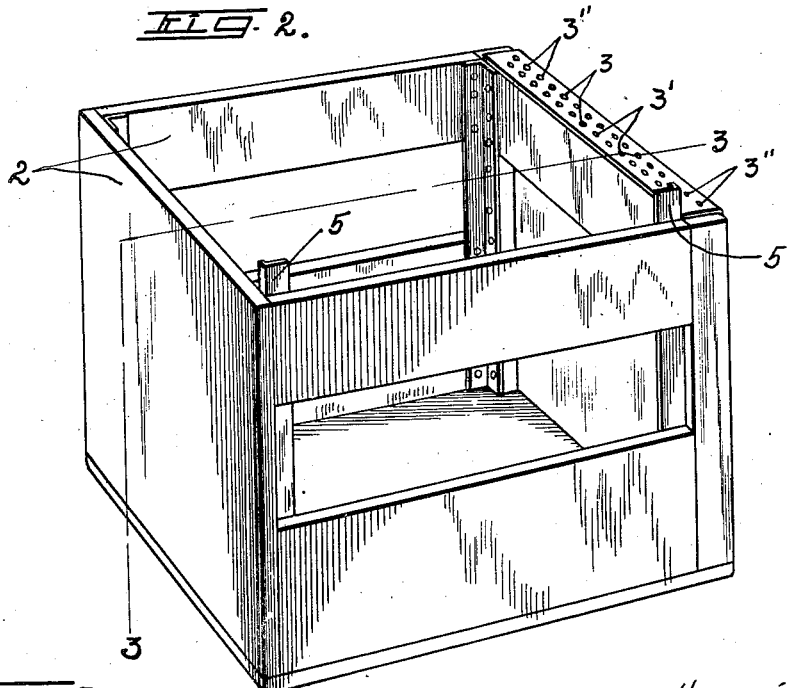
Figure 2 is a perspective of one of the pilot cars showing the location of the holes or recesses into one of which a tab-operating pin is placed.
Figure 3:
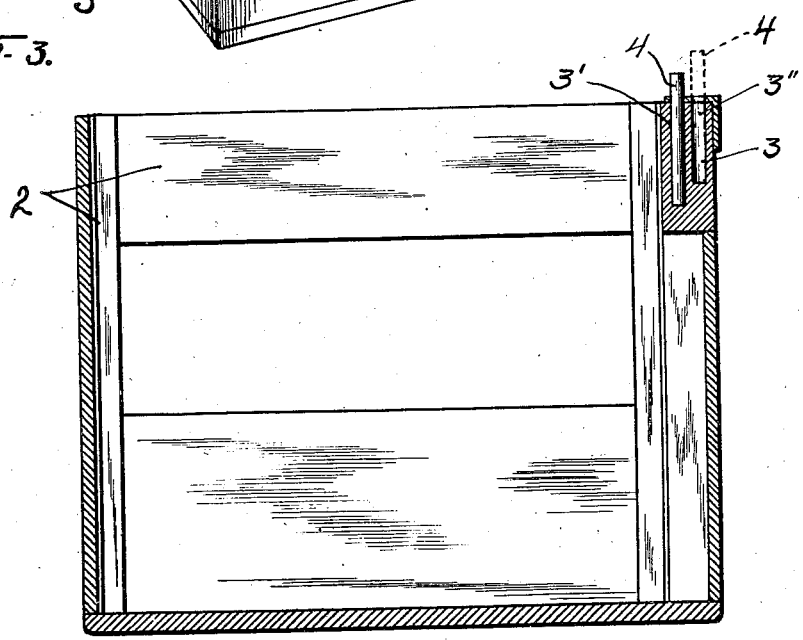
Figure 3 is a vertical longitudinal section through a pilot car taken in the plane of line 3—3, Figure 2.
Figure 4:
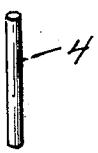
Figure 4 is a perspective view of one of the tab-operating pins.

Upon the third floor C in this instance, is located a straight gravity conveyor —1— upon which is placed a number of pilot cars —2—. The pilot car is a substantially constructed box, rectangular in plan view, and is of slightly greater height than the tallest container box or crate to be piloted through the conveyor system. Located in the top face of the front end wall of the pilot car —2— are a series of holes or recesses —3— arranged in rows. In this instance there are two rows, as is more clearly shown in Figures 2 and 3, the rear row of holes —3'— being made deeper than the front row —3"— so that when a pin —4— is placed in any one of the front row of holes 3", it will project a predetermined distance above the position it will assume when placed in any one of the rear row of holes 3'.

At one side, and projecting somewhat above the upper face of the pilot car —2— are secured two deflector-arms —5—, one at the forward end and the other near the rear end, for deflecting the pilot car —2— from a conveyor, as will be hereinafter more fully explained.

The pilot cars —2— are prevented from passing from the gravity conveyor —1— by a manually operated stop lever —6— and when it is desired to use one of the pilot cars —2—, an operator trips the stop lever —6— allowing the pilot car —2— to move onto the continuously moving belt conveyor —7— which carries the pilot car —2— up an incline and deposits it upon a second gravity conveyor —8—.

The belt conveyor —7— moves at such a speed as to carry the released pilot car away from the following pilot cars, thereby allowing the stop —6— to return to its normal position in front of the oncoming pilot cars, thereby preventing them from passing along the system. As the released pilot car —2— is passing over the gravity conveyor —8—, the operator or dispatcher places a pin —4— in one of the holes —3— depending upon the floor in which he wishes the pilot car to go, and the deflector he wishes to operate upon that floor, after which it is passed onto a continuously moving belt conveyor —9— upon which is mounted, in this instance, three double-acting automatic deflectors 10, 11 and 12 by means of which the pilot car —2— is automatically deflected onto one of the upward booster conveyors —13— or 14, the downward booster conveyor —15—, or permitted to pass through to the end of belt conveyor —9— and onto upward booster conveyor —16—. These booster conveyors will then deposit the pilot car —2— upon the top run of the continuously moving two-way feed belt conveyors —18—.

The double acting deflectors —10—, 11 and 12 consist of vertical supports 21 and 22 secured by rivets or other means at their lower ends to the side frame —23— of the belt conveyor —9—, as shown more clearly in Figures 5 to 10 inclusive. To the opposite or upper ends of the vertical supports —21— are secured bearings 223 in which are journaled horizontal rock-shafts —24— and —25—.

The rock-shafts —24— are located a short distance to the rear of the vertical supports —21— and a sufficient distance above the belt —26— to just allow the free passage of the pilot car —2— beneath the lower edge of tabs —27— and —27'— rigidly secured thereto. The tabs —27— located on the shafts 24 of the deflectors —10— and —11— extend a sufficient distance either side of the vertical center line of travel of the pilot car —2— to be in the path of a pin —4— placed in any one of holes —3— in the forward end thereof, while the tab —27'— located on the shaft 24 of the deflector —12— extends from the vertical center line of travel of pilot car —2— to the right a sufficient distance to be in the path of a pin —4— placed in any one of the holes —3'— on the right hand half of said pilot car —2—.

The rock-shafts —25— are positioned just forward of the vertical suports —21— and in the same horizontal plane as the rock-shafts —24—. Rigidly secured to the rock shafts —25— of the deflectors —10— and —11— are tabs —28— having their lower edges positioned a sufficient distance above the belt —26— to allow the free passage of the pilot car —2— together with a pin —4— placed in any one of the rear holes 3' in the front end of said pilot car. The lower edges of the tabs 28 are thus disposed above the lower edges of the tabs 27 a distance approximately the same as the difference in elevation between the top of a pin 4 placed in any one of the front holes 3" and the top of a pin placed in one of the three holes 3'.

Rigidly secured to the rock-shaft —25— of the automatic deflector —12— is a tab —28'— having its lower edge in the same horizontal plane as the lower edges of tabs —27—. Tab —28— of the automatic deflector —10— and the tab —28'— of the automatic deflector —12— extend from the center line of travel of the pilot car —2— to the left a sufficient distance to be in the path of a pin —4— when placed in any one of the holes —3— in the left side of pilot car —2—, while the tab 28 of deflector 11 extends from the vertical center line of travel of pilot car —2— to the right a sufficient distance to be in the path of a pin —4— placed in any one of the holes 3″ on the right of said pilot car.

Located at each of the automatic deflectors —10—, —11— and —12— is a horizontal deflector bar —31— rigidly secured at one end thereof to a vertical rotating shaft —225—. The lower end of said shaft is above the horizontal plane of the belt —26— and is journaled in a suitable bearing secured to one side of the conveyor frame —23—, while the upper end is journaled in a bearing secured to the forward upper end of the vertical support —22—. A crank arm —226— rigidly secured to the vertical shaft —225— near its upper end is connected by a link 41 to a second crank-arm 227 rigidly secured to the corresponding end of the rock-shaft —25—. The deflector bar —31— is free to swing from a stop-bar —228— positioned near the outer end of said deflector bar and secure to the side of conveyer frame —23— against the action of a retracting spring —40—, across the belt to the latch —29—.

It is now evident that a pin —4— placed in any one of the holes 3″ on the left side of the pilot car —2— will when the pilot car —2— is carried along by belt —26—, come in contact with the tab —27— of the deflector —10—, thereby rotating the rock-shaft —24— sufficiently to move the latch —29— downward against the action of a spring —30—, as clearly shown in Figure 6 of the drawings. This movement imparted to the latch 29 by the rotation of rock-shaft —24— is accomplished through the medium of a crank-arm —32— rigidly fastened to that end of the rock-shaft —24— which is positioned on the side of the conveyor frame 23 to which its cooperating latch —29— is secured. Crank-arm —32— is connected to one arm of a bell crank lever —33— by a connecting rod —34—, and bell crank lever 33 is rotatably mounted upon a shaft —35— secured to the lower end of one of the vertical supports —21—. The remaining arm of bell crank lever —33— is connected by a rod —36— to one arm of a bell-crank lever —37—, while the other arm is connected by a link —38— to the lower end of latch stem —29′—.

As the pilot car —2—, together with the pin —4— travels past the tab —27—, the pin —4— will next come into contact with the tab —28—, thereby rotating the rock-shaft —25— a sufficient distance to move the deflector bar —31— from an open position, as shown by full lines in Figure 5, to a closed position as shown by the dotted lines, thus bringing the deflector bar across the belt —26— and in the path of the oncoming pilot car —2—, automatically locking itself in the closed position by passing over the inclined portion of the latch —29—, forcing it down against the action of the spring —30—, said spring —30— returning the latch —29— to its normal position as soon as released by the deflector-bar —31—. The deflector bar —31— being locked in the closed position, will thereby deflect the pilot car —2— from the belt —26— onto the gravity conveyor —39— down which the pilot car —2— gravitates to the upward booster —13—.

If the despatcher now wishes to deflect a pilot car —2— from the belt conveyor —9—, at deflector —11—, thereby sending the pilot car —2— up the booster —14— to moving belt conveyor 18 located upon the sixth floor E, he will, after releasing one of the pilot cars —2— by operating the stop lever —6—, place a pin —4— in one of the holes 3″ located at the right of the vertical center line of pilot car —2— as it passes down the gravity conveyor —8—. As the pilot car —2— approaches the deflector —10— on belt conveyor —9—, the pin —4— will come in contact with the tab —27— rotating the rock-shaft —24— in an anti-clockwise direction, as viewed in Figure 6, and through the medium of the crank-arm —32—, connecting rod —34—, bell-crank lever —33—, connecting rod —36— bell-crank lever —37—, and the link —38— will force the latch —29— downward against the action of spring —30— out of the path of the deflector arm 31, thereby allowing the deflector arm —31— to be returned to the open position by means of a retracting spring —40—.

Pilot car —2— and pin —4— now have a clear passage to the deflector —11— where the pin —4— will come in contact with tab —27— located on shaft —24— and impart a rotating movement to shaft —24—, thereby allowing the pilot car —2— and pin —4— to pass to the tab —28—. As the pilot car —2— passes under the tab —28—, the pin —4— carries the tab —28— forward, rotating the shaft —25—, thereby moving the deflector bar —31— of deflector —11— from an open position, as shown in full lines in Figure 5, to a closed position, where it is locked by latch —29— as hereinbefore described, for deflector bar of the automatic deflector —10—.

Deflector bar —31— of the automatic deflector —11— being locked in a closed position, will intercept the pilot car —2— and deflect it from the moving belt —26— onto the gravity conveyor —39— located on the right hand side of the belt conveyor —9—, the pilot car —2— moving down the gravity conveyor —39— to the booster —14—.

By now placing a pin —4— in one of the holes —3′— positioned at the left of the center of a pilot car —2—, it will be seen that as the pilot car —2— approaches the deflector —10— on the belt conveyor —9—, the pin —4— will come in contact with the tab —27— rotating the shaft —24— and cause the latch —29— to be drawn down against the action of spring —30—, but as the deflector bar —31— has previously been released from the closed position and returned to the open position by the retracting spring —40—, the rotating of shaft —24— will have no mechanical effect upon it, and the pilot car —2— and pin —4— will pass on under the tab —28— without coming in contact with said tab —28—.

As the pilot car —2— approaches the deflector —11—, the pin —4— will come in contact with the tab —27— rotating shaft —24—, thereby causing the latch —29— to be drawn down against the action of spring —30— and releasing the deflector bar —29—, at which time the retracting spring —40— will move said deflector bar —31— from the closed position to the open position, permitting the pilot car —2— and pin —4— to pass along with the belt —26—.

Upon approaching the automatic deflector —12—, the pin —4— in the pilot car —2— will come in contact with the tab 28′, thereby rotating the shaft 25 and through the arms 227 and 226 and connecting bar 41 move the deflector bar from the open position across the belt —26— and over the latch —29—, depressing it against the action of spring —30— to its closed position, permitting the latch to again move upward to its normal position, thereby locking the deflector bar —31—.

Pilot car —2— being carried forward by the moving belt —26— is intercepted and deflected from the belt —26— on to the gravity conveyor —39—, which in turn allows the pilot car —2— to gravitate to the downward booster —15—.

Now, if after placing a pin —4— in one of the holes 3′ located to the right of the center of the pilot car —2—, the pilot car —2— is conveyed by belt —26— along the belt conveyor —9—, pin —4— will come in contact with the tab —27— of the automatic deflector —10—, and then of the automatic deflector 11, thereby rotating their respective shafts —24— and drawing their respective latches 29 down against the action of the springs 30, but having no other mechanical effect upon said deflectors —10— or 11, as the deflector bars —31— are both in their open position, and the pin —4— will pass beneath the tab —28— on automatic deflector —11—.

As the pilot car —2— approaches the automatic deflector —12—, the pin —4— will come in contact with tab —27′—, rotate the shaft —24— and move the latch 29 downward, releasing the deflector bar —31—, thereby permitting the retracting spring —40— to move the deflector bar —31— from the closed position to the open position, thus making a free and clear passage for the pilot car —2— to be moved to the foot end of the belt conveyor —9—, thence onto the gravity conveyor —60— in readiness to be taken up by the upward booster —16—.

Upward bosters 13, 14 and 16, and the downward booster 15, as indicated in the diagrammatic view, Figure 1, may be of any well known type, and for convenience and clearness of explanation, we have shown such a booster in detail in Figs. 13 to 18 inclusive.

The booster shown is an upward booster, and consists of a floor plate —42— securely fastened on either side by rivets or other suitable means, to supporting side-frames —43—. At one end of the side frames —43— is secured a vertical supporting framework —44— to which is rotatably secured a horizontal drive-shaft —45— having a drive pulley —46— secured to one end, while to the opposite end thereof is secured a drive pinion —47—, and drives a gear —48— mounted upon one end of a horizontal sprocket-shaft —49— rotatably mounted by suitable bearings to the upright frame —44—. To the sprocket-shaft —49— are secured two sprocket gears —50— in spaced relation to each other, and in operating alinement with two chain supporting tracks —51— and —52— Fig. 15 secured to the side frames —43— and vertical frames —44— and —53—. The upper tracks —51— are secured to the top of the side frames —43— and at some distance above the floor plate —42—, while the lower tracks are secured to the lower edges of the side frames —43— and positioned below the floor plate —42—. These chain supporting tracks —51— and —52— extend substantially the total length of the booster from and including the upright support —44— to the upright support —53— positioned at the opposite end, as more clearly shown in Figures 16 and 17.

Adjustably mounted on the upright supporting frame —53— is a take-up shaft —54— upon which are secured two sprocket gears —55 in spaced relation to each other in alinement and cooperating with the sprocket gears —50— at the opposite or drive end of the booster.

Keyed to the take-up shaft —54— between the sprocket gears —55— and in spaced relation, are a number of corrugated feed-rolls —56— between which and held in close relation to them are a number of automatic stops —57— rotatably mounted on said shaft —54— and held against rotating therewith by tail pieces —57′ secured to the stops —57— and extending forward between the under side of the floor-plate —42— and a supporting horizontal rod —57″ mounted at either end to the side frame —43—, as more clearly disclosed in Figures 17 and 18.

The sprocket chains —58— carried by the tracks —51— and —52— run continuously about the sprocket-gears —50— and —55— on their respective sides of the booster, and the chains —58— are held in spaced relation throughout their entire length by the pusher bars —59— spaced at uniform distances apart throughout the entire length of the chains, depending somewhat upon the size of the crates and pilot cars to be carried by said booster.

In operation, the object to be carried by the booster, whether it is one of the pilot cars —2— or a crate or box of merchandise, as indicated by the dot and dash lines in Figure 17, is carried to the receiving end of the booster by one of the gravity conveyors —39—, where it is brought to rest by the automatic stops —57— projecting in the path of said pilot car —2—, or crate of merchandise. The contact face of the automatic stop —57— is positioned in relation to the sprocket gears —55— so that as the pilot car —2— is brought to a stop, the front end thereof will project into the path of one of the pusher bars —59—, as it is carried about the periphery of the sprocket gears —55— by the chain —58—, which travels from the lower track —52— about the sprocket gear —55— onto the upper track —51—, as indicated by the arrows.

As the pusher bar —59— comes in contact with the bottom of the pilot car —2—, it will lift the front end of the pilot car —2— and carry it forward until such time as the front end of the pilot car —2— comes in contact with the preceding crate or pilot car, as indicated by dotted lines, X' by which it is held stationary until the pusher bar —59— moves from under the bottom of the first pilot car and engages the rear end of a second pilot car or crate, thereby pushing the second object along the floor plate —42— and up tne booster to the drive end thereof, where it is deposited onto a gravity conveyor —60— leading to the upper run of one of the two-way feed belt conveyors —18—. As the pusher bar —59— leaves the bottom of the first object at X', the front end thereof will drop onto the corrugated drive rolls —56— which will carry the pilot car —2— or crate forward, and deposit it upon the floor-plate —42— in readiness to be pushed forward by the next pusher-bar as it travels up the booster, as indicated by the dot and dash lines X".

Upon the upper portion of the two-way feed belt conveyor 18 there are placed at frequent intervals double-acting automatic deflectors —61—, Figures 19 to 22 inclusive, which are comprised of a deflector bar —62— rigidly secured at one end to a vertical rotating shaft —63— mounted to one side of the feed belt conveyor —18—, while the opposite end of the deflector bar —62— is free to swing from a stop member —64— (located on the same side of the conveyor as the deflector bar supporting shaft 63) against the action of a retracting spring 87 across the belt to a latch —65— yieldingly supported on the opposite side of the conveyor —18—. The upper end of the vertical deflector bar supporting shaft —62— is journaled in a suitable bearing secured to the upper end of a vertical frame —66— while the opposite, or lower end passes through a bearing secured to the frame —67— of the feed belt conveyor —18— and has a radial arm —68— secured thereto. The arm —68— is connected by a rod —69— to one arm of a bell crank lever —70— pivoted to the conveyor frame —67— while the other arm of the bell crank lever —70— is connected by a rod —71— to a lever —72— mounted on one end of a horizontal rock shaft —73— journaled in suitable bearings —74— secured to the upper portion of a vertical frame —75—, which is supported at its lower end by the conveyor frame —67—, and positioned far enough ahead of the vertical support —66— to allow the deflector bar —62— to operate behind the pilot car as it actuates the deflector tab —76—.

A deflector-actuating tab —76— is adjustably mounted on the rock-shaft —73— between the bearings —74— and is so positioned as to be in the path of a pin —4— which has previously been placed in one of the holes —3— of an approaching pilot car —2—.

To a rock-shaft —77— journaled in suitable bearings secured to the upper portion of the vertical frame —66— is secured a latch-actuating tab 78 positioned between said bearings, while to one end thereof is secured a radial rock-arm —79— connected to one arm of a bell crank lever —80— by a rod —81—. The other arm of the bell crank lever —80— is connected to one end of a second bell crank lever —82— by a rod —83—, both bell crank levers —80— and 82— being fulcrumed to the framework —67— of the conveyor.

The second arm of the bell crank —82— is connected to the latch stem —65'— of the latch 65 by a link —84—, said latch stem being slidably mounted in a bearing —85— secured to the framework. The latch —65— is held in its upward normal position by a spring —86— coiled about the latch stem —65'— and positioned between the latch —65— and bearing —85—.

It is now apparent that as a pilot car is carried along the upper run of a two-way feed belt conveyor —18—, a pin —4— carried in any one of the holes —3— will come in contact with and actuate the latch tab —78— as it approaches each of the automatic double-acting deflectors —61—, thereby forcing the latch —65— downward against the action of the spring —86—, releasing all deflector bars —62— held in the closed position, thereby allowing the deflector bar to be returned to the open position against the limiting stop —64— by a retracting spring —87— giving the pilot car a free and clear passage along the conveyor.

The deflector bars —62— therefore normally remain in the open position, and are only moved to the closed position when the pin —4—, placed in a hole —3— registering with a deflector operating tab 76, comes in contact with and actuates said tab. The deflector bar thus brought to the closed position and locked there by the latch —65— after the pilot car itself has passed the selected deflector spur conveyor, will deflect all crates or boxes of merchandise, following a given pilot car from the belt conveyor onto the gravity spur conveyor —88— stationed at said deflector until such time as a second pilot car is dispatched along the feed belt conveyor, when the pin 4 will again actuate the latch tab —78— thereby releasing the deflector bar and allowing it to be returned to its open position by the retracting spring 87.

The pilot cars, continuing their travel along the conveyor to the end of the upper run of a two-way feed belt conveyor, are fed on to, in this instance, curved gravity conveyors 89 which deposit the pilot cars upon the lower run of the two-way feed belt conveyor. The pilot car is then carried along by the lower belt until it is intercepted by a stationary deflector 90 which deflects the pilot car from the lower run of the two-way feed belt conveyor 18 onto a chute 91 down which it travels to the gravity conveyor 92.

The stationary deflector 90 may be located at any convenient place along the lower run of the two-way feed belt conveyor 18, and is composed of a deflector bar 93, Figs. 23 and 24, and extends obliquely across the belt and is held in position by two vertical supports 94 secured in a suitable manner at their lower ends, to opposite sides of the conveyor framework. The deflector bar 93 is held at such a height above the conveyor belt as to allow the free operation of the pilot car beneath it, but low enough to intercept the deflector arms —5— located on one side of the pilot car —2—.

As the pilot car —2— travels to the lower end of the gravity conveyor 92 it is fed onto a fixed automatic gravity feed 95 secured to the framework of the vertical conveyor, and located at each of, in this instance four automatic loading stations, three of which are movable and one, located at the lower end of the vertical conveyor 96, being a fixed loading station.

The vertical conveyor 96 consists of a vertical framework 97 divided into two vertical conveyor shafts secured in this instance to the floor A, Figure 1, and extends upward through suitable openings in the succeeding floors B, C, D, and E. An electric motor 98 mounted on the framework 97 near the upper end of the vertical conveyor 96 has a drive-shaft 99 protruding from each end thereof. A solenoid brake mechanism 100 of any suitable make, is secured to the drive-shaft 99 located at one end of the motor 98, while the drive-shaft 99 at the opposite end of the motor is connected to a speed reducing gear mechanism 101 (see Figs. 31 and 32) also mounted on said framework 97 by a flexible coupling 99'. To the drive-shaft 102 of the speed reducing gear 101 is keyed or otherwise secured a pinion 103 which meshes with and drives a gear 104 mounted on one end of the conveyor drive shaft 105, which is journaled in suitable bearings secured to the top of the conveyor framework. Two sprocket wheels 106 are secured to the drive shaft 105 between the bearings thereof, and spaced from each other a sufficient distance to permit an elevator car 107 to pass between them as it is carried along by the endless chains 108 to which the elevator car 107 is pivoted, as the chain passes about the periphery of said sprocket wheels.

As the endless sprocket chain 108 leaves the sprocket-wheel 106, it travels down the rear side of the vertical conveyor past the unloading station, and about the periphery of two take-up sprocket-wheels 109 mounted upon a horizontal rotating shaft 110 journaled in suitable bearings 111 slidably mounted in ways 112 secured to the framework at or near the lower end of the vertical conveyor 96. The sprocket chain 108 then completes its cycle of travel by passing up the front side of the vertical conveyor past the loading stations to the drive sprocket wheels 106 at the top of the conveyor.

Pivotally connected to the sprocket chain 108 and carried thereby are a number of automatic selective elevator cars 107 equally spaced thereon. The elevator car is composed of two vertical side arms 113 connected together and held in spaced relation by a square shaft 114 pinned to guide members 115 secured to the outer face of the lower ends of said side arms, while bolted or otherwise secured to the outer face of the upper ends of the side arms are guide blocks 116 in each of which is rotatably mounted a pin 117. Said pin 117 protrudes from the outer face of the guide block 116 a sufficient distance to pass through the eyes in the links of the sprocket chain 108 and serve as one of the link connecting pins for the chain, thereby connecting the elevator car to the chain.

The guide blocks 116 and 115 extend outward from the outer face of the vertical arms 113 sufficiently to travel between two guide rails or tracks 118 secured to the framework 97 of the vertical conveyor, said guide rails or tracks 118 extending from the bottom to the top of the vertical conveyor substantially in the plane of the vertical travel of the sprocket chain 108, thereby holding the elevator car 107 in its normal upright position and preventing any tendency of the car to swing or rock about the supporting or carrying pin 117.

Secured to the inner face of one of the vertical arms 113 extending transversely thereto, and some distance above the floor supporting shaft 114 is a fixed trip member 119, the rearward radial arm 120 thereof actuating a rock-arm to open the movable loading station while the front radial arm 121 actuates the trip-arm of the automatic feed on the stationary loading station, said arm 121 having its outer end projected downward at right angles thereto, to form an elongated bearing face 122 for the purpose of holding the automatic feed in operating position a sufficient length of time to insure the loading of a pilot car in the station.

To either side of a plate 123 secured to the inner face of the remaining vertical arm 113 are secured guide-bars 124 with a movable station trip bar 125 slidably mounted therein. The trip bar is moved from and to its normal operating position by a rock-arm 126, which is connected therewith by a pin 127 secured to the trip bar 125, and moving in a slot in the upper end of the rock arm 126. The lower end of said rock arm is rigidly secured to one end of a tubular shaft 128 rotatably mounted on a shaft 129 secured to the lower ends of the vertical arms 113, while to the other end of the tubular shaft 128 is secured a rock-arm 130 projecting forward and upward therefrom to a short distance above the upper face and between two radial floor arms 131 rigidly mounted in spaced relation and intermediate their ends upon the square shaft 114.

As the arms 131 constitute the bottom floor of the vertical elevator car, it is now clear that as a flat bottom article, such as a pilot car comes to rest upon the floor arms 131, the rock lever 130 will be forced downward about the axis of the supporting shaft 129, thereby rotating the tubular shaft 128 a sufficient amount to cause the rock lever 126 carried thereby to move inward to the stop pin 132, secured to the plate —123— thereby drawing the trip bar 125 inward to the position shown in dotted lines, Figure 37.

A retracting spring 133, one end of which is secured to the rock-arm 126 and the other end to the plate 123, returns the rock arms 130 and 126, and thereby the station trip bar 125 to their normal position as soon as the article carried by the elevator car is removed.

A fixed loading station located at or near the lower end of the vertical conveyor receives the pilot cars returning from the two way feed belt conveyor 18 located on the next floor B above the fixed loading station. As the pilot cars are fed from the gravity conveyor 92 onto the fixed gravity feed 95 of said fixed station (see Figs. 29 and 30) they are brought to rest upon the fixed gravity feed station by the stop roll 134 located near the lower inner end thereof and held in a plane above said gravity feed station by suitable brackets secured to opposite sides of the station.

The fixed gravity feed consists of two siderails 135 secured to the conveyor-frame at an angle thereto in any suitable manner, as by a bracket 136 composed of two angle irons with their adjacent flanges riveted together and one of the two remaining flanges fastened to the bottom of the side rails 135, while the other flange is secured to a suitable bracket 137 fastened to the frame 97 of the vertical conveyor. Between the side rails 135 and at the upper outer end thereof are a plurality of suitable gravity rollers 138 journaled in spaced relation to the said side rails while between the gravity rolls 138 and the stop-roll 134 is an automatic feed roll 139 held in its normal position in the horizontal plane of the gravity rolls 138 by two vertical posts 140 in the top end of which is journaled the feed roll 139, while a portion of the lower ends are cut away, forming a shoulder 141 and a tailpiece 142, the shoulder 141 resting upon a flange member 143 secured to the bracket 137 which limits the downward movement of the posts and feed roll, while the tail piece 142 passes through slots 144 in the flange member 143, and acts as guide supports for the lower end of the posts.

To each of the vertical posts 140 and intermediate the ends thereof is pivoted one end of a crank-arm 145 having its other end rigidly mounted to a rock-shaft 146 journaled at its ends in suitable bearings 147 secured to the bracket 137.

In a vertical plane to one side of the fixed loading station, and between one of the rock-arms 145 and bearing 147 is a rock-arm 148 rigidly mounted upon the shaft 146 and connected to a feed trip-arm 149 by a connecting rod 149'. The feed trip arm 149 is located above the plane of the loading station and pivoted at one end to a horizontal shaft 150 mounted upon the frame 97, while the arm 149 extends inward a sufficient distance to be in the path of the radial arm 121 mounted on the elevator car.

The station loading platforms 151 and 152 are composed of side rails 153 and 154 respectively secured in spaced relation at their outer ends to horizontal cross-members secured to the framework of the vertical conveyor and at an angle thereto, while their inner ends are spaced from each other sufficiently to permit the free passage of the elevator floor-arm supporting bar 114. Between the side rails 153 and 154 and journaled thereto are gravity rolls 155 positioned in spaced relation between the stop bar 180 on the station platform 152 and the outer end of station platform 151.

The total width of the station platforms is less than the distance between the elevator car floor arms 131 to permit said floor arms to freely pass.

The plane of the rolls 155 is at an angle to the horizontal plane of the stop-roll 134 on the fixed gravity feed and cooperates with said stop-roll to form a gravity conveyor from the fixed gravity feed to the elevator car loading position.

The fixed automatic gravity feed positioned at each of the movable loading stations is constructed substantially the same as the one for the fixed loading station with the addition of an automatic lock-trip 156 rigidly mounted on a rock-shaft 157 in a horizontal plane below, and at right angles to said gravity feed station. At the upper end of the lock trip 156 and between two radial upward curved arms thereof is journaled a roll 156' held normally in a horizontal plane above the upper face of the gravity feed station and between the automatic feed roll 139 and the gravity rolls 138 by an arm 158 rigidly secured to the rock-shaft 157 and having a weight 159 adjustably mounted thereon.

The rock-shaft 157 is journaled in bearings 160 to opposite sides of the brackets 137 and has a radial arm 161 secured to one end thereof and connected by a connecting rod 162 to one side of a station-closing lever 163 located in the opposite side of the elevator-shaft and held in operative engagement with a bifurcated crank arm 164 by a pin 165 rigidly secured in one end thereof and extending through a vertical elongated slot 166 terminating at its lower end in a short horizontal rearwardly projecting slot 166' having a slightly enlarged end in the station closing lever 163. The pin 165 is normally positioned in coaxial alinement with both the vertical and horizontal portions of the slot 166 by the action of the counterweight arm 158 tending to force the station-closing lever 163 rearward and a counterweight 167 rigidly secured to the shaft 170 holding said station-closing lever in its normal up position.

The station closing lever is connected by a rod 168 to a crank-arm 169 rigidly mounted to a rock-shaft 170 journaled in bearings 171 secured to the framework 97 in a horizontal plane below the movable loading stations. A radial arm 172 is rigidly mounted on the rock shaft 170 and projects inward in the vertical path of the movable station trip bar 125 carried by the elevator car and is actuated thereby when said trip bar is in its normal outward position as the elevator is approaching a movable loading station.

The crank-arm 164 is rigidly secured to one end of a rock shaft 173 journaled horizontally in bearings 174 secured to opposite sides of the frame 97. Rigidly secured to the rock-shaft 173 in the vertical plane of the respective fixed gravity feed station is a movable station platform 175 composed of two side-rails 176 held in spaced relation by a cross-bar 177 secured to the lower face of either end thereof, and spacing rods 178 secured in spaced relation to the upper flanges of the side-rails 176.

Near the inner ends of the side rails and journaled thereto in spaced relation are two gravity rolls 179, while secured to the top of the side rails and projecting in a vertical plane therefrom is a fixed stop-bar 180 of greater length than the width of the object to be loaded, and having the ends thereof flanged outward and inward to act as centering guides for the object being loaded on the station platforms.

At the outer end of the side-rails 176, and to the under face thereof are secured supporting brackets 181 which in turn are rigidly mounted on the rock-shaft 173.

To the opposite end of the rock-shaft 173 to that of which the crank-arm 164 is mounted, is rigidly secured a crank-arm 182 connected to a second crank-arm 183 mounted on the rock-shaft 184 by the connecting rod 185. The rock-shaft 184 is journaled in suitable bearings 174' secured to the upper face of the brackets 137 in a horizontal plane below the fixed gravity feed station and a short distance ahead thereof.

Rigidly secured to the rock shaft 184 in the vertical plane of and coacting with the loading platform station 175 is a second movable loading platform station 186 having side-rails 187 held in spaced relation by cross-bars 188 secured to the under face of the ends of the side-rails 187 and spacing rods 189 secured in spaced relation to the upper flanges of said side-rails. To the under face of the outer ends of the side-rails 187 are secured two supporting brackets 190 rigidly journaled on the rock-shaft 184.

Journaled to the side-bars 187 in spaced relation are a plurality of (in this instance five) gravity rolls 191 which, when the loading platform stations 175 and 186 are lowered to the loading position, are in alinement and cooperate with the stop-roll 134 on the fixed gravity feed station and the gravity rolls 179 carried by the loading platform station 175 to form a gravity conveyor to bring the object to be loaded in alinement with the vertical movement of the vertical conveyor car.

To the outside face of one of the side rails of the fixed platform-loading station 151 and the movable platform station 186 is a movable stop pawl 192 pivoted to one side of its center to a pin 193 carried by the side rail of the finger station, the longer portion of this pawl 192 extending rearwardly and being held normally parallel with the side rail by a rest-member 194 which is secured to the under face of the adjacent side rail, while the shorter portion is turned upward at an angle to the side rail and projects above the plane of the loading platform station sufficiently to prevent the rebound of the object being loaded as it is brought to a sudden stop by the fixed stop-bars 180 located in their respective loading platform stations.

To the rock-shaft 184 at one side of the movable finger station 186 is rigidly secured a crank-arm 195 connected by a connecting rod 196 to a radial arm 197 rigidly secured to the feed roll actuating shaft 146, thereby connecting the automatic feed-roll to the station-operating mechanism by which the feed roll is actuated at the movable loading stations.

A rock arm 198 fulcrumed near the center thereof to the shaft 170 has one arm extending inward in the vertical path of the fixed trip lever 120 on the vertical conveyor car, while the other arm is connected by a connecting rod 199 to a radial arm 200 rigidly secured to the finger station rock-shaft 173. The movable platform loading stations 175 and 186 are held in their open position by radial arm 201 rigidly secured to the rock-shaft 173 and having weights 202 adjustably mounted thereon and normally resting on fixed stops 203 secured to the framework 97 of the vertical conveyor, while the horizontal bars 204 positioned between the station pivotal shafts 173 and 184 and secured to the framework limit the downward movement of said platform stations and support them in the closed or loading position.

It is now evident that the first vertical elevator car passing up through the fixed loading station after a pilot car has been fed into the fixed gravity feed thereof, will, as the arm 121 on the elevator car engages the feed trip arm 149 carrying said trip arm upward, rotate the rock-shaft 146 and lift the automatic feed roll 139 up to or above the horizontal plane of the stop roll 134, thereby carrying the front end of the pilot car up over the top of the stop-roll 134—as shown by the dotted lines, Figure 30, by which time the radial arm 121 on the vertical elevator car will have passed above the feed trip arm 149, thereby permitting said feed trip arm and the automatic feed roll 139 to return by gravity to their normal position. The pilot car is now free to gravitate on to the fixed station platforms 151 and 152 and be brought to an at-rest position in the vertical path of the elevator car by the fixed stop bar 180 mounted on the station platform 152 ready to be picked up by the following vertical elevator car.

As the pilot car is picked up by the vertical elevator car the bottom of said pilot car will come in contact with the detent 130 on the elevator car and force the movable station closing trip bar 125 inward out of the vertical plane of the radial arms 172, thereby permitting the vertical elevator car to pass up through the movable loading stations without actuating the loading platforms thereof.

As soon as the first pilot car on the gravity feed station is fed on to the fixed loading platform any succeeding pilot car remaining outside the station on the gravity conveyor 92 will immediately follow on to the gravity feed station ready to be automatically fed onto the loading platform by the action of each vertical elevator car upon the feed roll 139.

The vertical elevator car will thus continue to load from the bottom or fixed loading station until all the pilot cars at that station have been removed.

The first vertical elevator car to pass through the emptied fixed loading station will through the medium of the station closing trip bar 125 coming in contact with the radial arm 172, rock the lever 169 downward, thereby forcing the station-closing lever 163 downward, and if there is no pilot car waiting in the gravity feed station, said station-closing lever will be in its normal position, as shown in full lines in Figure 27. The pin 165 will remain in the vertical elongated slot 166, and this particular loading station will be unaffected as the empty vertical elevator car passes up through it.

If, however, a pilot car has been fed onto the fixed automatic gravity feed station previous to the empty vertical elevator car passing the rock-arm 172, the lock trip 156 will have been rocked downward, as shown in the dotted lines, Fig. 27, by said pilot car, drawing the station-closing lever 163′ over until the pin 165 registers with the enlarged portion of the slot 166′.

It is now clear that as the empty vertical elevator car passes the rock-arm 172 and actuates it, the station-closing lever 163 will rock the arm 164 downward, rotate the shaft 172 and move the loading platforms 175 and 186 from the open to the closed position, as shown in dotted lines, Fig. 28. As loading platforms 175 and 186 are being closed, the automatic feed roll 139 will be actuated thereby, lifting the forward end of the pilot car above the stop roll 134 and permitting it to gravitate down the loading platforms to the stop-bar 180 in position to be picked up by the empty vertical elevator car as it passes through the station.

As the loading platforms are moved from the open to the closed position, the inward projecting end of the rock-arm 198 will be moved downward, as shown in dotted lines in Fig. 28, so that as the now loaded vertical elevator car moves up away from the automatic movable loading station, the radial arm 120 on said car will engage the inner end of the rock arm and restore it to its normal position, thereby rotating the rock-shaft 181 and return the loading platforms to the open position.

It is now clear that the vertical elevator car will always be loaded at the lowest or first loading station at which there is a pilot car waiting, and will carry its load up through the remaining loading station or stations without actuating or closing the station. The vertical elevator car, together with its load, are carried by the endless sprocket chain about the periphery of sprocket wheels 106, which are so constructed as to permit the elevator car to pass above the sprocket shaft 105 and down the rear vertical conveyor shaft of the vertical conveyor to the fixed unloading station which is, in this instance located near the ceiling of the floor C.

The fixed unloading station consists of two fixed gravity platforms 210 and 211 arranged at an angle to the horizontal plane of the vertical conveyor. The platforms consist of side rails 212 and 213 respectively, held in spaced relation by two horizontal channel bars 214 secured to the outer ends of each, said channel bars being mounted on the side frames 97 of the vertical conveyor. The side rails 212 and 213 are spaced apart at their inner ends in the vertical plane of the center line of travel of the elevator car a sufficient distance to permit the free passage of the floor arm and supporting shaft 114 of the elevator car, while the total width of the finger conveyors is less than the distance between the inner faces of the elevator car floor arms 131.

Between the side rails 212 of the gravity platform 210 are journaled in spaced relation, in this instance, two gravity rollers 215 which are in the plane of and cooperate with five gravity rollers 216 journaled in spaced relation between the upper flanges of the side rails 213 of the gravity platform 211.

It is now clear that as the vertical elevator car 107 passes down through the fixed unloading station, that the load carried thereby which is in this instance a pilot car, will be deposited upon the station gravity conveyor platforms 210 and 211, from which it will gravitate to the gravity conveyor 217, from which it is fed on to the continuously moving belt conveyor 218 which carries the pilot car to the curved gravity conveyor 219, from which said pilot car is deposited onto the gravity conveyor —1—, where it is held by the stop lever —6— in position to again travel around through the system upon being released by the operator.

It may now be clearly understood that a dispatcher or operator wishing to convey crates or boxes of merchandise to one of several floors of a building for the purpose of being segregated into general storage, will release one of the pilot cars on the gravity conveyor —1—, and as it is moving along the gravity conveyor —8—, place a pin —4— in one of the holes or recesses —3— in said pilot car. If it is desired to send the merchandise to the floor D, the despatcher will place a pin —4— in one of the holes 3″ in the front row, and at the left of the center of the pilot car, depending upon which deflector he wishes to close on the two-way feed belt conveyor 18 upon floor D, as each tab 76 will be located upon the deflector 61 in a position to intercept and be actuated by a pin located in one of the holes 3″ on the left side of the pilot car, each hole having one tab in the vertical plane of movement thereof.

If it is desired to close the second deflector, then the pin would be placed, for example, in the second hole from the left side of the pilot car. If the third deflector is the one to be closed, then the pin would be placed in the third hole from the left side of the pilot car, etc.

It is now evident that with the deflector —10— closed by a pin in a hole 3″ on the left of center of the pilot car, that said pilot car will be diverted to the upward booster 13, thence on to the two-way feed belt conveyor 18, floor D, where one of the deflectors 61 will be closed, depending upon the particular hole the pin is placed in, after the pilot car has passed ahead of the deflector-bar 62 of said deflector 61.

It is also clear that all crates of merchandise now placed upon the gravity conveyor —8— will gravitate on to the moving belt conveyor 9 and be diverted therefrom by the closed deflector 10 onto the upward booster 13, and on to the two-way feed belt conveyor 18 located on floor D, from which the crates will be diverted by the closed deflectors 61 on to a spur gravity conveyor 88 ready to be taken up by a workman and placed in tiers upon said floor, while the pilot car continues on its course to the curved gravity conveyor 89 on to the lower return run of the two-way feed belt conveyor 18, from which it is deflected by the stationary deflector 90 on to the chute 91 to the gravity conveyor 92, and thence to the automatic movable loading station on the vertical conveyor 96, from which station the pilot car is conveyed by a vertical conveyor car to the unloading station, and thence by the gravity conveyor 217, the moving belt conveyor 218, and curved gravity conveyor 219 to the starting position upon the gravity conveyor.

When it is desired to send the crated merchandise to some other locality, whether upon floor D, or upon some other floor, another pilot cam is released by the despatcher, who places a pin in the proper hole —3— in said pilot car to operate the desired deflectors.

Altho we have shown and described a specific apparatus together with details of form, relation and association of the parts thereof as constituting an embodiment of our invention, we do not desire to restrict ourselves to the specific apparatus, nor to the details of form, construction and arrangement of the same, as various changes and modifications may be made within the scope of the appended claims.

We claim:

1. In a conveying apparatus, a conveyor, a branch conveyor leading therefrom, a pilot car adapted for convoying one or more containers along said conveyor, a deflector, and means actuated by the pilot car after the pilot car has passed the deflector for closing the deflector.

2. In a conveying apparatus, a conveyor, a branch conveyor leading therefrom a pilot car adapted for convoying one or more articles along said conveyor, and means actuated by the pilot car after the pilot car has passed the branch conveyor for deflecting the convoy into the branch conveyor.

3. In a conveying system, a main conveyor, a branch conveyor leading therefrom, a switch adapted to deflect articles from the main conveyor to the branch conveyor when the switch is in closed position, a pilot car, and means actuated by the pilot car for opening said switch before the pilot car reaches the branch track, and additional means actuated by the pilot car for closing a selected switch after the pilot car has passed the branch track.

4. In a conveying apparatus, a conveyor, a branch conveyor leading therefrom, a pilot car adapted for convoying one or more containers along said conveyor, a deflector, means actuated by the pilot car after the pilot car has passed the deflector for closing the deflector, and means for returning the pilot car to a starting position for convoying other articles.

5. In a conveying apparatus, a conveyor, a branch conveyor leading therefrom, a pilot car adapted for convoying one or more articles along said conveyor, means actuated by the pilot car after the pilot car has passed the branch conveyor for deflecting the convoy onto the branch conveyor, and means for returning the pilot car to a starting position for convoying other articles.

6. In a conveying system, a main conveyor, a branch conveyor leading therefrom, a switch adapted to deflect articles from the main conveyor to the branch conveyor when the switch is in closed position, a pilot car, means actuated by the pilot car for opening said switch before the pilot car reaches the branch track, additional means actuated by the pilot car for closing a selected switch after the pilot car has passed the branch track, and means for returning the pilot car to a starting position for convoying other articles.

7. In a conveying apparatus, a conveyor, a branch conveyor leading therefrom, a pilot car adapted for convoying one or more containers along said conveyor, a deflector, means actuated by the pilot car after the pilot car has passed the deflector for closing the deflector, and means including an elevator for returning the pilot car to a reconvoying station.

8. In a conveying apparatus, a conveyor, a branch conveyor leading therefrom, a pilot car adapted for convoying one or more articles along said conveyor, means actuated by the pilot car after the pilot car has passed the branch conveyor for deflecting the convoy onto the branch conveyor, and means including an elevator for returning the pilot car to a reconvoying station.

9. In a conveying system, a main conveyor, a branch conveyor leading therefrom, a switch adapted to deflect articles from the main conveyor to the branch conveyor when the switch is in closed position, a pilot car, means actuated by the pilot car for opening said switch before the pilot car reaches the branch track, additional means actuated by the pilot car for closing a selected switch after the pilot car has passed the branch track, and means including an elevator for returning the pilot car to a reconvoying station.

10. In a conveying apparatus, a conveyor, a branch conveyor leading therefrom, a pilot car adapted for convoying one or more containers along said conveyor, a deflector, means actuated by the pilot car after the pilot car has passed the deflector for closing the deflector, and means for returning the pilot car to a reconvoying station including means for conveying the pilot car to the lower run of said conveyor.

11. In a conveying apparatus, a conveyor, a branch conveyor leading therefrom, a pilot car adapted for convoying one or more articles along said conveyor, means actuated by the pilot car after the pilot car has passed the branch conveyor for deflecting the convoy onto the branch conveyor, and means for returning the pilot car to a reconvoying station including means for conveying the pilot car to the lower run of said conveyor.

12. In a conveying system, a main conveyor, a branch conveyor leading therefrom, a switch adapted to deflect articles from the main conveyor to the branch conveyor when the switch is in closed position, a pilot car, means actuated by the pilot car for opening said switch before the pilot car reaches the branch track, additional means actuated by the pilot car for closing a selected switch after the pilot car has passed the branch track, and means for returning the pilot car to a reconvoying station including means for conveying the pilot car to the lower run of said conveyor.

13. In a conveying apparatus, a conveyor, a branch conveyor leading therefrom, a pilot car adapted for convoying one or more containers along said conveyor, a deflector, means actuated by the pilot car after the pilot car has passed the deflector for closing the deflector, means for returning the pilot car to a reconvoying station including an elevator having elevator cars, a loading station adjacent the elevator, means for stopping the pilot car at the loading station, and means actuated by an empty elevator car for releasing the pilot car from said stopping means and conveying the pilot car to a position at which it will be picked up by the empty elevator car.

14. In a conveying apparatus, a conveyor, a branch conveyor leading therefrom, a pilot car adapted for convoying one or more articles along said conveyor, means actuated by the pilot car after the pilot car has passed the branch conveyor for deflecting the convoy onto the branch conveyor, means for returning the pilot car to a reconvoying station including an elevator having elevator cars, a loading station adjacent the elevator, means for stopping the pilot car at the loading station, and means actuated by an empty elevator car for releasing the pilot car from said stopping means and conveying the pilot car to a position at which it will be picked up by the empty elevator car.

15. In a conveying system, a main conveyor, a branch conveyor leading therefrom, a switch adapted to deflect articles from the main conveyor to the branch conveyor when the switch is in closed position, a pilot car, means actuated by the pilot car for opening said switch before the pilot car reaches the branch track, additional means actuated by the pilot car for closing a selected switch after the pilot car has passed the branch track, means for returning the pilot car to a reconvoying station including an elevator having elevator cars, a loading station adjacent the elevator, means for stopping the pilot car at the loading station, and means actuated by an empty elevator car for releasing the pilot car from said stopping means and conveying the pilot car to a position at which it will be picked up by the empty elevator car.

16. In a conveying apparatus, a main conveyor, a plurality of branch conveyors leading therefrom, a deflecting mechanism at each branch conveyor, a pilot car for convoying articles along the main conveyor, means in connection with the pilot car for opening any closed deflector mechanism before the pilot car reaches the branch track, and means in connection with the pilot car for closing a selected deflector mechanism after the pilot car has passed the branch conveyor in connection with which said selected deflecting mechanism is associated.

17. In a conveying apparatus, a main conveyor, a plurality of branch conveyors leading therefrom, a deflecting mechanism at each branch conveyor, a pilot car for convoying articles along the main conveyor, means in connection with the pilot car for opening any closed deflector mechanism before the pilot car reaches the branch track, means in connection with the pilot car for closing a selected deflector mechanism after the pilot car has passed the branch conveyor in connection with which said selected deflecting mechanism is associated, means for returning the pilot car to a reconvoying station including an elevator, a loading station adjacent the elevator, and means for automatically controlling the operation of said loading station to control the supply of pilot cars to the elevator.

18. In a conveying apparatus, a main conveyor, a branch track leading therefrom, a deflector for deflecting articles from the main conveyor onto the branch conveyor, a pilot car, and means whereby said pilot car will actuate the deflector after passing the same.

19. In a conveying apparatus, a main conveyor, a branch track leading therefrom, a deflector for deflecting articles from the main conveyor onto the branch conveyor, a pilot car, means whereby said pilot car will actuate the deflector after passing the same, and means for returning the pilot car to a reconvoying station including an elevator equipped with elevator cars, a loading station adjacent the elevator, means for stopping pilot cars at the loading station, and means actuated by an empty elevator car for releasing said stopping means and for conveying the pilot car to a position where it will be picked up by said elevator car.

20. In a conveying apparatus, a main conveyor, a branch track leading therefrom, a deflector for deflecting articles from the main conveyor onto the branch conveyor, a pilot car, means whereby said pilot car will actuate the deflector after passing the same, means for returning the pilot car to a reconvoying station including an elevator equipped with elevator cars, a loading station adjacent the elevator, means for stopping pilot cars at the loading station, means actuated by an empty elevator car for releasing said stopping means and for conveying the pilot car to a position where it will be picked up by said elevator car, and means actuated by the elevator car after passing said loading station for returning elements of the loading station to a normal position.

21. A conveyor system including separate conveying apparatus disposed at separate places, a conveyor adapted to supply articles to any one of said separate conveyors, a pilot car for convoying articles along said conveyor and to and along any one of said separate conveyors, means actuated by the pilot car for determining to which one of said separate conveying apparatus it shall convoy said articles, branch tracks in connection with said separate conveying apparatus, and means actuated by the pilot car for determining onto which one of said branch conveyors the convoyed articles shall be deflected.

22. A conveyor system including separate conveying apparatus disposed at separate places, a conveyor adapted to supply articles to any one of said separate conveyors, a pilot car for convoying articles along said conveyor and to and along any one of said separate conveyors, and means actuated by the pilot car after it has passed a selected branch track for deflecting the convoyed articles on to said selected branch track.

23. In a conveying mechanism embodying a plurality of separate conveyors, means for selectively supplying articles to any one of said conveyors comprising a main conveyor having associated with it a plurality of switch mechanisms, a pilot car movable along said main conveyor and having means for opening a plurality of said switch mechanisms, one of said switch mechanisms including a switch-operating tab overlying approximately one-half of the width of the pilot car and another of said switch mechanisms including a tab for operating its switch and overlying substantially the other half of the pilot car.

24. In a conveying mechanism embodying a plurality of separate conveyors, means for selectively supplying articles to any one of said conveyors comprising a main conveyor having associated with it a plurality of switch mechanisms, a pilot car movable along said main conveyor and having means for opening a plurality of said switch mechanisms, one of said switch mechanisms including a switch-operating tab overlying approximately one-half of the width of the pilot car and another of said switch mechanisms including a tab for operating its switch and overlying substantially the other half of the pilot car, and another switch mechanism including a tab positioned at a different height than the previously mentioned tabs.

25. In a conveying apparatus, a conveyor, a branch conveyor leading therefrom, a pilot car adapted for convoying one or more articles along said conveyor, a deflector means actuated by the pilot car after the pilot car has passed the deflector for closing the deflector, and means actuated by a pilot car following the articles to be convoyed for opening said deflector.

26. The combination with a conveying apparatus including a main conveyor and branch conveyors, of mechanism for diverting packages or articles from the main conveyor to the branch conveyors, and traveling means adapted selectively to operate said mechanism to cause the diversion of the articles from the main conveyor to a selected branch conveyor and thereafter to cause said traveling means to return to its starting point.

27. The combination with a conveying apparatus including a main conveyor and branch conveyors, of mechanism for diverting packages or articles from the main conveyor to the branch conveyor, and traveling means adapted to operate said mechanism to cause the diversion of the articles from the main conveyor to a selected branch conveyor, said mechanism also effecting the return of the traveling means to its starting point.

28. An apparatus of the class described, comprising a main conveyor, branch conveyors leading therefrom, mechanism for diverting articles from the main conveyor to the branch conveyors, a member adapted to travel over the main conveyor, and control means on said member adapted to operate said mechanism to effect the diversion of articles from the main conveyor to a selected branch conveyor, said mechanism also permitting the return of said movable member to its source.

29. An apparatus of the class described, comprising a main conveyor, a plurality of branch conveyors leading therefrom, deflecting mechanisms on said main conveyor for diverting articles therefrom to the branch conveyors, a member movable over the main conveyor and adapted selectively to actuate one of said deflecting mechanisms to cause articles to be diverted from the main conveyor to a selected branch conveyor, said mechanisms also permitting the return of the movable member to its source.

30. An apparatus of the class described, comprising a main conveyor, a plurality of branch conveyors leading therefrom, deflecting mechanisms on said main conveyor for diverting articles therefrom to the branch conveyors, a member movable over the main conveyor and adapted selectively to actuate one of said deflecting mechanisms to cause following articles to be diverted from the main conveyor to a selected branch conveyor, and means adapted to be engaged by the member to effect the return of said member to its starting point after having actuated a selected deflecting mechanism.

31. An apparatus of the class described, comprising a main conveyor, a plurality of branch conveyors leading therefrom, a deflecting member on said main conveyor at each branch conveyor for deflecting articles therefrom to the branch conveyors, means for normally retaining said deflecting members in operative positions, operating mechanisms for said deflecting members, a routing member movable over the main conveyor, and a control means on said routing member engageable with one of said operating mechanism to move its complementary deflecting member to inoperative position and to permit the routing member to continue onward uninterrupted over the main conveyor, after which said operating mechanism will cause said deflecting member to be returned to its normal operative position to divert following articles from the main conveyor onto a selected branch conveyor.

32. An apparatus of the class described, comprising a main conveyor and a branch conveyor, a deflector for diverting articles from the main conveyor onto the branch conveyor, an operating mechanism for said deflector, means for normally holding the deflector in inoperative position, a routing member movable over the main conveyor, control means on said routing member for actuating said operating mechanism, said operating mechanism comprising a depending member positioned over the main conveyor and adapted to be engaged by said control means to cause it to move to its operative position over the main conveyor, and means also operable by said control means to cause the return of the deflector to its inoperative position and permit the routing member to return to its starting point.

33. An apparatus of the class described, comprising a main conveyor and a branch conveyor, a deflector normally positioned to divert articles from the main conveyor onto said branch conveyor, operating mechanism for said deflector, a routing member movable over the main conveyor, a control means on said routing member for actuating said operating mechanism, said mechanism comprising a bar pivotally mounted over the main conveyor and adapted to be engaged by said control means to effect the release of said deflector and allow it to swing to its inoperative position and permit the routing member to pass thereby and return to its source, and means also operable by said control means to return said deflector to its operative position to divert following articles onto said branch conveyor.

34. An apparatus of the class described, comprising a main conveyor and a branch conveyor, a deflector for diverting articles from the main conveyor onto said branch conveyor, a pawl normally holding said deflector in operative position over the main conveyor, means tending normally to move said deflector to its inoperative position, a bar transversely arranged over said main conveyor and having a connection with said pawl, a routing member movable over the main conveyor, control means on the routing member for actuating said bar to release said deflector and cause it to move to its inoperative position and to permit the routing member to pass thereby and return to its starting point, and a member also positioned over said main conveyor and having a connection with said deflector and adapted to be actuated by said control means to return said deflector to its operative position to divert following articles onto said branch conveyor.

35. In a conveyor system, a main conveyor, a branch conveyor leading therefrom, a switch adapted to deflect articles from the main conveyor to the branch conveyor when the switch is in the closed position, means operable for opening said switch and means operable for closing said switch, the first said means being actuable by a traveling member before reaching the branch conveyor and the second said means being actuable by the member after passing the branch conveyor.

In witness whereof we have hereunto set our hands this 8th day of October, 1927.

JAMES T. COWLEY.
LAVONT C. ALLEN.